(12) United States Patent
Chen

(10) Patent No.: US 10,928,695 B1
(45) Date of Patent: Feb. 23, 2021

(54) ROTATED DISPLAYS FOR ELECTRONIC DEVICES

(71) Applicant: Facebook Technologies, LLC, Menlo Park, CA (US)

(72) Inventor: Dong Chen, Foster City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/600,265

(22) Filed: Oct. 11, 2019

(51) Int. Cl.

| | | |
|---|---|---|
| G02F 1/133 | (2006.01) | |
| G02F 1/1362 | (2006.01) | |
| G02F 1/1343 | (2006.01) | |
| G02F 1/1337 | (2006.01) | |
| G02F 1/1368 | (2006.01) | |
| G02F 1/1335 | (2006.01) | |

(52) U.S. Cl.
CPC ...... *G02F 1/136286* (2013.01); *G02F 1/1368* (2013.01); *G02F 1/13439* (2013.01); *G02F 1/133528* (2013.01); *G02F 1/133723* (2013.01); *G02F 1/134309* (2013.01); *G02F 2001/133531* (2013.01)

(58) Field of Classification Search
CPC ................................................ G02F 1/136286
See application file for complete search history.

(56) References Cited

U.S. PATENT DOCUMENTS

| | | | |
|---|---|---|---|
| 2002/0033922 A1* | 3/2002 | Hidehira | ........... G02F 1/134363 349/141 |
| 2005/0078258 A1* | 4/2005 | Kim | .................. G02F 1/134363 349/141 |
| 2008/0018557 A1 | 1/2008 | Maeda | |
| 2011/0214082 A1 | 9/2011 | Osterhout et al. | |
| 2014/0002491 A1 | 1/2014 | Lamb et al. | |
| 2015/0309312 A1 | 10/2015 | Alton et al. | |
| 2015/0319412 A1 | 11/2015 | Koshiba et al. | |
| 2017/0270841 A1 | 9/2017 | An et al. | |
| 2017/0280134 A1 | 9/2017 | Woods | |
| 2018/0136471 A1 | 5/2018 | Miller et al. | |
| 2018/0376082 A1 | 12/2018 | Liu | |
| 2019/0266974 A1 | 8/2019 | Chen | |

\* cited by examiner

*Primary Examiner* — Sang V Nguyen
(74) *Attorney, Agent, or Firm* — Freestone Intellectual Property Law PLLC; Aaron J. Visbeek; Andrew J. Cameron

(57) ABSTRACT

Various aspects of the subject technology relate to display panels for head-mountable devices. A display panel may include a left-eye pixel array and a right-eye pixel array that are each rotated with respect to a horizontal defined by a straight line connecting the centers of the arrays. The rotated pixel arrays each include data lines and scan lines that extend at oblique angles relative to the horizontal. A liquid crystal layer of the display panel may include liquid crystal molecules having a default orientation at an oblique angle relative to both the data lines and the scan lines of both of the rotated pixel arrays. The rotated pixel arrays may each include pixel circuits arranged along the data lines and scan lines, each pixel circuit including a transparent electrode oriented at an oblique angle relative to both the scan lines and the data lines.

19 Claims, 13 Drawing Sheets

ROTATED DISPLAYS FOR ELECTRONIC DEVICES

BACKGROUND

Field

The present disclosure generally relates to electronic displays and, more particularly, to rotated displays for electronic devices.

Description of the Related Art

Displays, such liquid crystal displays, typically include an array of display pixels arranged in vertical rows and columns. The vertical and horizontal orientation of these rows and columns is typically maintained, relative to a horizontal line extending between the user's eyes, by a fixed housing of a television or a computer monitor, or by the user holding a mobile phone or a tablet device for simultaneous viewing with both eyes.

Liquid crystal displays have more recently been provided, in the same vertical/horizontal orientation, in head-mountable devices such as head-mountable displays for virtual reality (VR) systems. In these devices, the left and right eyes of the user view different pixels in a common pixel array, or may view separate pixel arrays. For reasons of spatial efficiency, some head-mountable devices are provided with separate left and right eye pixel arrays that are rotated away from the horizontal, in opposite directions.

However, various challenges can arise when providing rotated display pixel arrays for viewing by different eyes of a user.

SUMMARY

The present disclosure provides display panels for an electronic devices. The disclosed display panels may be implemented, for example, in head-mountable devices, such as devices for virtual reality (VR), mixed reality (MR), and/or augmented reality (AR) applications. In the disclosed display panels, a first display pixel array is positioned within a housing, for generating display light for a left eye of a user, and is rotated away from the horizontal in a first angular direction. A second display pixel array is positioned, within the housing, for generating display light for a right eye of the user, and is rotated away from the horizontal in a second, opposite, angular direction. Each array includes a liquid crystal layer having vertically aligned liquid crystal molecules. The vertically aligned liquid crystal molecules in each array are oriented at an angle between a direction defined by the gate or scan lines of the array, and a perpendicular direction defined by the source or data lines of the array. Each display pixel may include at least one vertically aligned transparent electrode, such as an indium tin oxide pixel electrode, that is aligned with the vertically aligned liquid crystal molecules of that pixel.

According to some aspects of the present disclosure, a liquid crystal display panel is disclosed that includes a control circuitry layer including a plurality of parallel scan lines, a plurality of parallel data lines arranged perpendicularly to the plurality of parallel scan lines, and an array of display pixel circuits arranged along the scan lines and the data lines. The liquid crystal display panel also includes a liquid crystal layer comprising liquid crystal molecules having a default orientation at an oblique angle with respect to both the scan lines and the data lines. Each of the display pixel circuits includes at least one transparent electrode that has an elongate dimension that is aligned with the default orientation of the liquid crystal molecules at the oblique angle with respect to the scan lines and the data lines.

According to some aspects of the present disclosure, a head-mountable display device is provided that includes a housing configured to be mounted to a head of a user, a display panel, within the housing, including a left-eye pixel array to display left-eye content and a right-eye pixel array to display right-eye display content, a left-eye lens having a first lens center and mounted to the housing in optical alignment with the left-eye pixel array, and a right-eye lens having a second lens center and mounted to the housing in optical alignment with the right-eye pixel array. The left-eye pixel array includes a first plurality of parallel data lines that extend at a first oblique angle relative to a straight line connecting the first lens center and the second lens center. The right-eye pixel array includes a second plurality of parallel data lines that extend perpendicularly to the first plurality of parallel data lines and at a second oblique angle with respect to the straight line connecting the first lens center and the second lens center. The left-eye pixel array includes a first array of display pixel circuits, each including at least one transparent electrode having an elongate dimension arranged at a third oblique angle relative to the first plurality of parallel data lines. The right-eye pixel array includes a second array of display pixel circuits each including at least one transparent electrode having an elongate dimension arranged at a fourth oblique angle relative to the second plurality of parallel data lines.

According to some aspects of the present disclosure, a liquid crystal display panel is provided that includes a display panel including a left-eye pixel array having a first array center and a right-eye pixel array having a second array center. The left-eye pixel array includes a first plurality of parallel data lines that extend at a first oblique angle relative to a straight line connecting the first array center and the second array center. The right-eye pixel array includes a second plurality of parallel data lines that extend perpendicularly to the first plurality of parallel data lines and at a second oblique angle with respect to the straight line connecting the first array center and the second array center. The liquid crystal display panel also includes a liquid crystal layer having a plurality of liquid crystal molecules having a default orientation that is aligned substantially perpendicularly to a straight line connecting the first array center and the second array center.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Head-mountable display devices can include individual display panels, or individual portions of a display panel, that are visible to the individual eyes of a user, when the head-mountable display device is worn by the user. For example, a left-eye lens and a right-eye lens may be mounted in a housing of the device to focus light from a left-eye display pixel array and a right-eye display pixel array, respectively, into the left and right eyes of the user.

Disclosed herein, are display panels for head-mountable display devices, in which various components of the display panel are aligned for spatial and energy efficiency of the display panel while maintaining viewing quality for the user, relative to each other and relative to, for example, a horizontal line defined by the line between the user's eyes (or by a straight line connecting two lenses or two pixel arrays arranged for viewing by the user's two eyes).

For example, and as described in further detail hereinafter, the data lines and source lines of each of a right-eye pixel array and a left-eye pixel array of the display panel may extend in directions that are oblique to a straight line between the array centers of the right-eye pixel array and the left-eye pixel array. For example, and as described in further detail hereinafter, a default orientation of the liquid crystal molecules of a liquid crystal layer of the display panel, and/or an elongate dimension of the pixel electrodes of the display pixel circuits of the left-eye pixel array and/or the right-eye pixel array, may be arranged at an oblique angle relative to the data lines and the source lines of that array.

Example Head-Mountable Display System

Figure 1:
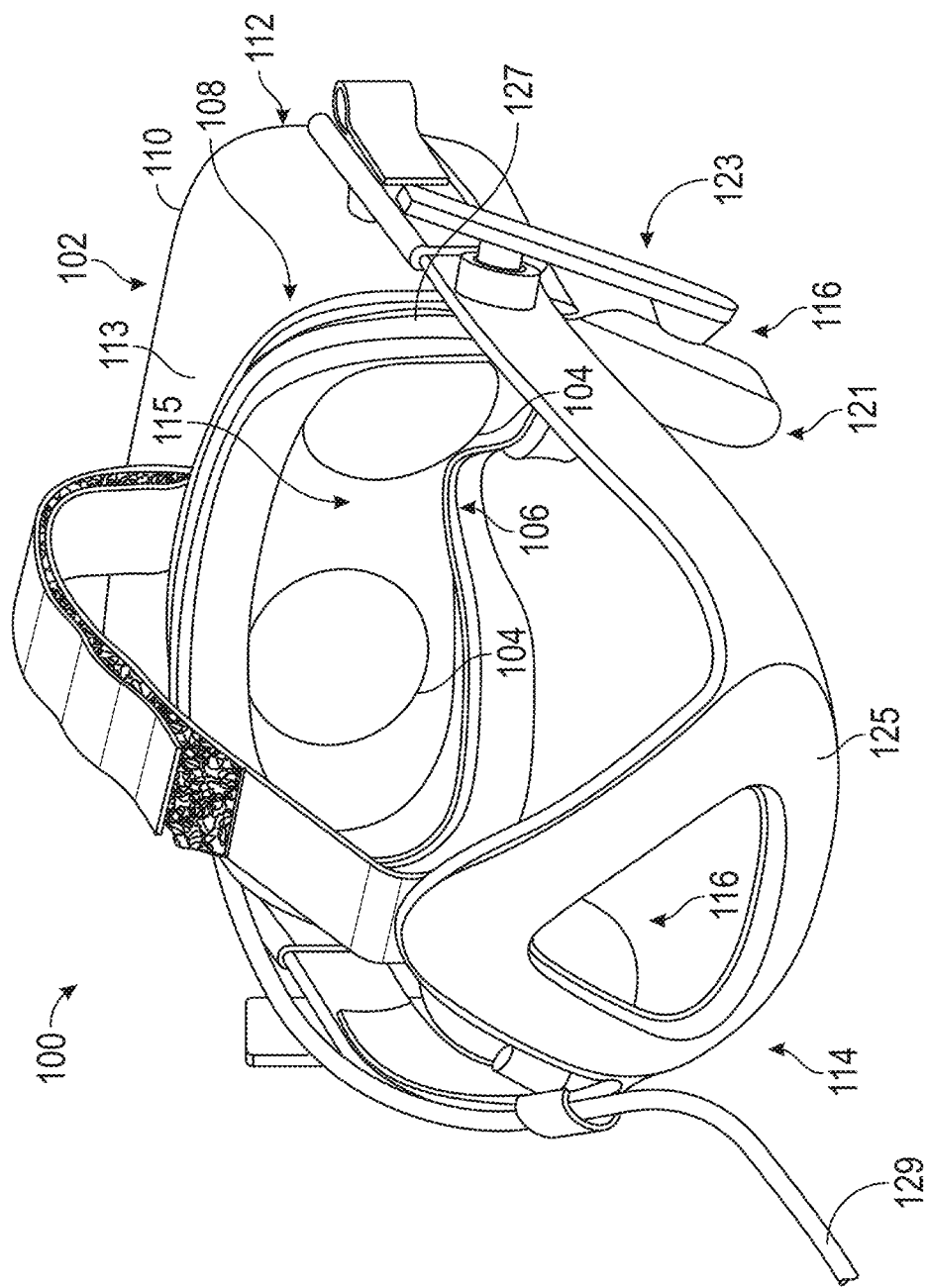
FIG. 1 illustrates a perspective view of a head-mountable display device, in accordance with aspects of the disclosure.

FIG. 1 illustrates an example head-mountable display system 100, in accordance with aspects of the disclosure. As shown in FIG. 1 head-mountable-display system 100 may include a head-mountable display device 102, a facial-interface system 108, a strap assembly 114, and audio subsystems 116. A head-mountable display device may include any type or form of display device or system that is worn on or about a user's head and displays visual content to the user. Head-mountable display devices may display the visual content in any suitable manner, including via a display panel (e.g., an LCD or LED display panel), a projector, a cathode ray tube, an optical mixer, etc. Head-mountable display devices may display content in one or more of various media formats. For example, a head-mountable display device may display video, photos, and/or computer-generated imagery (CGI).

In the example of FIG. 1, head-mountable display device 102 includes a display housing 110 within, and/or to, which various components of head-mountable display device 102 can be mounted, including lenses 104 and/or various electronic components, including display components as described herein. Display housing 110 may include a housing back surface 112 and peripheral surfaces 113 substantially surrounding one or more internal components, and an opening 115 surrounding a viewing region 106 at a front side of display housing 110.

Head-mountable display devices such as head-mountable display device 102 may provide diverse and distinctive user experiences. Some head-mountable display devices may provide virtual-reality (VR) experiences (i.e., they may display computer-generated or pre-recorded content to a user and block out the user's view of their real-world surroundings), while other head-mountable displays may provide real-world experiences (i.e., they may display live imagery from the physical world). Head-mountable displays may also provide any mixture of live and virtual content. For example, virtual content may be projected onto a view of physical world (e.g., via optical or video see-through), which may result in augmented reality (AR) or mixed reality (MR) experiences for the user. Head-mountable display devices such as head-mountable display device 102 may be configured to be mounted to a user's head in a number of ways. Some head-mountable display devices may be incorporated into glasses or visors. Other head-mountable display devices may be incorporated into helmets, hats, or other headwear.

Head-mountable display device 102 may include or be implemented in conjunction with an artificial reality system. Artificial reality refers to a user experience of audio, visual, tactile, and/or other sensory output of a device, the output having been created by the device or adjusted by the device relative to the real world, before presentation to a user. Artificial reality can refer to, e.g., a virtual reality (VR), an augmented reality (AR), a mixed reality (MR), a hybrid reality, or some combination and/or derivative thereof. Artificial reality content may include content that is entirely virtual device-generated and/or system-generated content, and/or can include virtual content that is combined with real-world content that is directly viewable by the user (e.g., through a transparent or semitransparent portion of the device) or that is captured by one or more system cameras and displayed to the user by the device.

The artificial reality content may include video, audio, haptic feedback, or some combination thereof, and any of which may be presented in a single channel or in multiple channels (such as stereo video that produces a three-dimensional visual effect to the viewer). Additionally, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mountable display (sometimes referred to as a head-mounted display (HMD) without intending to require that the HMD is currently being worn on a user's head) connected to a host computer system, a standalone HMD, a mobile device or computing system, or any other hardware platform capable of providing artificial reality content to one or more viewers.

Audio subsystems 116 may include speakers 121 mounted to housing 110 (e.g., by extensions 123) and may be integrated with head-mountable display device 102 or formed from separate components that are mounted to the housing or directly attachable to the user's ears. Audio subsystems 116 may provide audio signals to the user's ears in conjunction with or separate from displayed content. Head-mountable-display system 100 may, for example, have two audio subsystems 116 located on the left and right sides of head-mountable-display device 102 to provide audio signals to the user's left and right ears, as shown in FIG. 1.

As shown, head-mountable display device 102 may include a strap assembly 114 that may be used for adjustably mounting head-mountable display device 102 on the user's head. As shown in FIG. 1, strap assembly 114 may include lower straps and/or an upper strap that are coupled to head-mountable display device 102 to adjustably conform to the top and/or sides of the user's head when the user is wearing head-mountable-display system 100. Strap assembly 114 may include a back piece 125 coupled with the upper strap and lower straps to rest against the back of the user's head (e.g., around the user's occipital lobe). In at least one embodiment, the back piece may include an opening that is dimensioned and positioned to securely fit around a back portion (e.g., a portion of the user's occipital bone) of the user's head.

Facial-interface system 108 may be configured to comfortably rest against a region of the user's face, including a region surrounding the user's eyes, when head-mountable-display system 100 is worn by the user. For example, facial-interface system 108 may include an interface cushion 127 that is configured to rest against portions of the user's face (e.g., at least a portion of the user's nasal, cheek, temple, and/or forehead facial regions). Facial-interface system 108 extend around viewing region 106 and be arranged to allow a user wearing head-mountable display device 102 to look through lenses 104 of head-mountable display device 102 without interference from outside light.

Figure 2:
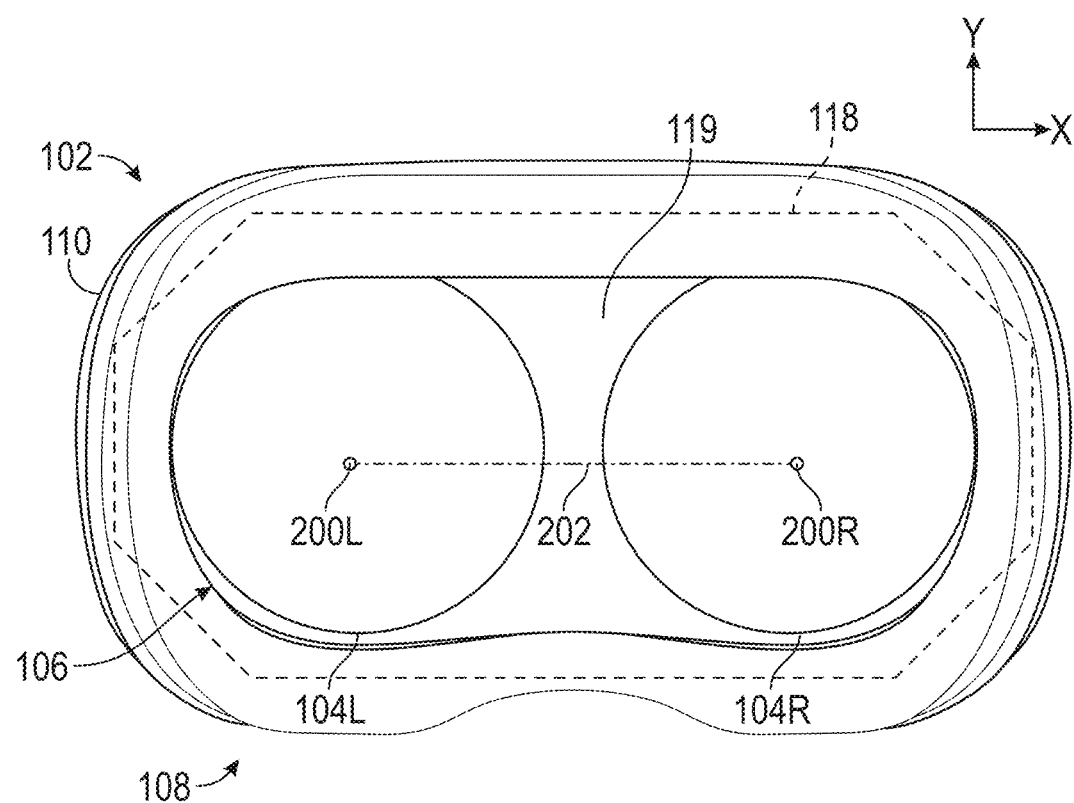
FIG. 2 illustrates a face-on view of the head-mountable display device, in accordance with aspects of the disclosure.

FIG. 2 shows a face-on view of head-mountable display device 102, in accordance with aspects of the disclosure. As indicated in FIG. 2, head-mountable display device 102 may include a display panel 118 disposed within display housing 110. Display panel 118 may be implemented as a liquid crystal display (LCD) panel, a light-emitting diode (LED) display panel or a display panel implementing other display pixel technologies. In one suitable implementation that is discussed herein as an example, display panel 118 is an LCD panel having LCD display pixels.

As shown in FIG. 2, display panel 118 may be disposed within display housing 110 so as to overlap left-eye lens 104L and right-eye lens 104R, such that images produced by corresponding regions of display panel 118 are visible to a user through left-eye lens 104L and right-eye lens 104R. For example, distinct portions of display panel 118 may be visible to each of the user's eyes, with the distinct portions of the display panel being separated by a dividing region (e.g., portions of separate eye cups for each lens, a central dividing partition, etc.) extending between display panel 118 and a mounting structure for left-eye lens 104L and right-eye lens 104R. Such a configuration may enable distinct images to be presented, by display panel 118 to each of the user's eyes, allowing for 3-dimensional content to be perceived by the user. While a single contiguous display panel 118 (a contiguous panel having a display region for each eye of the user) is illustrated in FIG. 2, it should be appreciated that head-mountable display device 102 may be provided with multiple display panels (e.g., one display panels such as one LCD display panel for each eye of the user). For example, a head-mountable display device may include two LCD display panels, with a separate LCD display panel being visible to each of a user's left and right eyes, or a single LCD display panel with two pixel arrays formed on separate substrates.

As shown in FIG. 2, head-mountable display device 102 may also include a light-blocking layer 119 surrounding left-eye lens 104L and right-eye lens 104R. Light-blocking layer 119 may, for example, extend between left-eye lens 104L and right-eye lens 104R and surrounding portions of display housing 110. Light-blocking layer 119 may include, for example, a light-absorbing material (e.g., a dark polymeric and/or fabric material) that masks internal components of head-mountable display device 102 and that prevents any outside light incidentally entering viewing region 106 (e.g., through a gap between the user's face and facial-interface system 108) from being reflected within viewing region 106.

Display housing 110 may be formed from a rigid material, such as a rigid plastic, that supports and protects internal components housed therein, such as display panel 118 and other electronics. At least a portion of display housing 110, such as a portion of display housing 110 surrounding viewing region 106, may include a light-absorbing material that prevents passage of external light and prevents reflection of light incidentally entering viewing region 106. Blocking external light and/or preventing reflection of light in viewing region 106 of head-mountable display device 102 may greatly enhance a user's immersive viewing experience by ensuring that nearly all light visible to the user is display light emitted from display panel 118. Referring back to FIG. 1, head-mountable display device 102 may be provided with a connecting cable 129 that communicatively couples the head-mountable display device 102 to a remote system such as a remote computing device (e.g., a desktop computer, a tablet, a game console, a server, a dedicated computer, or the like) that generates content to be displayed by display panel 118. However, it should also be appreciated that head-mountable display device 102 may be wirelessly coupled to a remote computing device.

Figure 3:
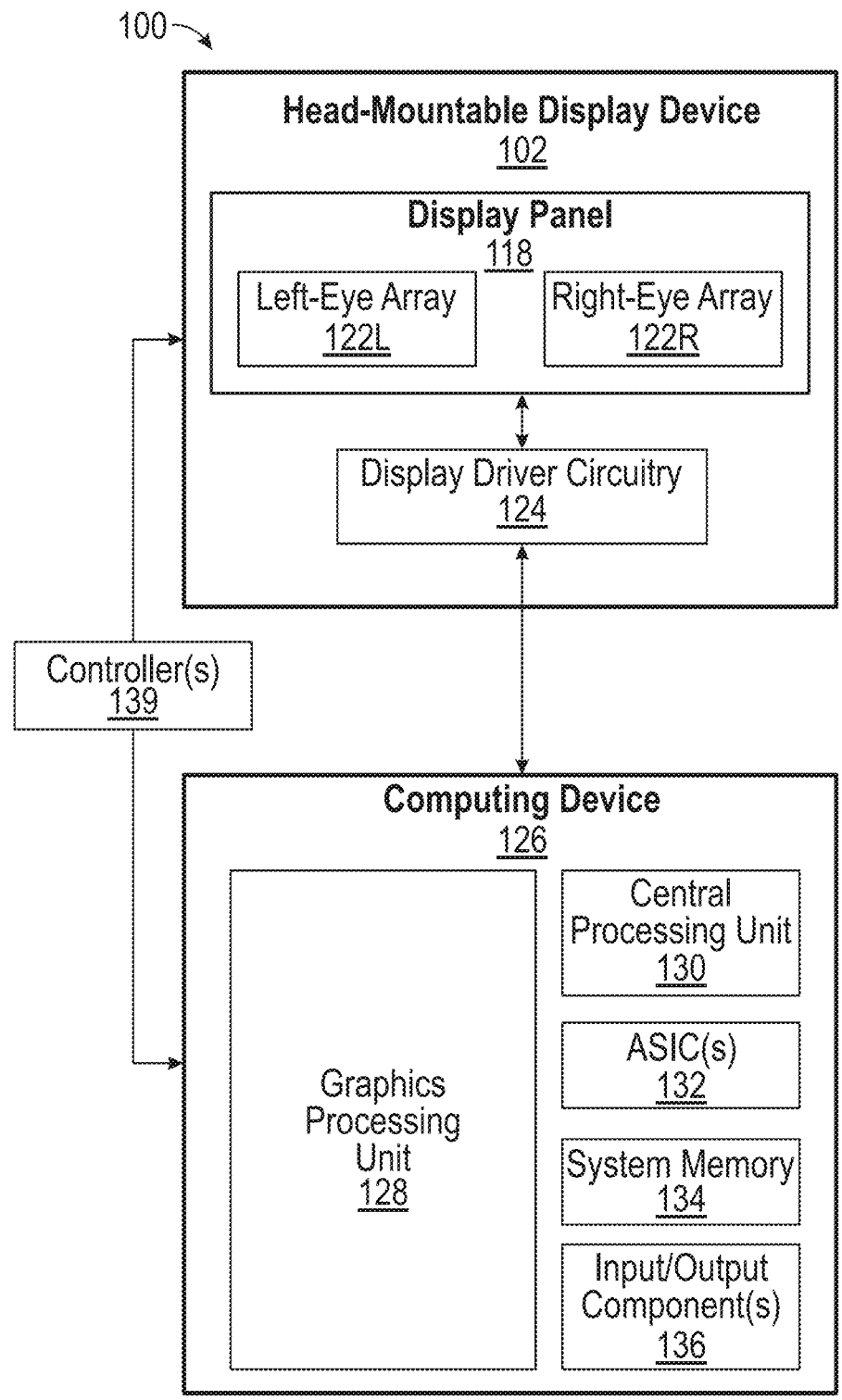
FIG. 3 illustrates a schematic diagram of circuitry for a head-mountable display system, in accordance with aspects of the disclosure.

FIG. 3 shows a block diagram of various components that may be included in head-mountable display system 100, in accordance with aspects of the disclosure. As shown in FIG. 3, system 100 may include head-mountable display device 102 communicatively coupled to another computing device 126 (e.g., via cable 129 of FIG. 1 or via wireless connection such as a WiFi communications connection, a BLUETOOTH communications connection, cellular communications connection, a mobile satellite communications connection, etc.). Additionally or alternatively, system may include one or more controllers 139 such as gaming controllers that provide user input to head-mountable display device 102 or computing device 126, any/or other suitable type of display device (e.g., a television, a computer monitor, a laptop monitor, a tablet device, a portable device, such as a smartphone or cellular telephone, a wrist-watch device, a pendant device or other wearable or miniature device, a media player, a camera viewfinder, a gaming device, a navigation device, and/or any other type of device including an electronic display panel, without limitation).

In the example, of FIG. 3, computing device 126 is depicted as a separate computing device that is remote from head-mountable display device 102. Computing device 126 may be, for example, a gaming and/or multimedia console or device, a desktop computer, a laptop computer, a tablet computer, a cellular phone, a smart phone, a wearable device, an embedded system, an internet router, another head-mountable display device, a hand-held controller, etc. However, it should be appreciated that any or all of the computing components described in connection with computing device 126 can be implemented within head-mountable display device 102.

As indicated in FIG. 3, display panel 118 of head-mountable display device 102 may include a left-eye pixel array 122L and a right-eye pixel array 122R. Left-eye pixel array 122L and right-eye pixel array 122R may be portions of a single contiguous pixel array on display panel 118, or may be formed from separate pixel arrays on a contiguous or segmented display panel. Left-eye pixel array 122L and right-eye pixel array 122R are arranged to be visible, respectively, to the left and right eyes of a user wearing head-mountable display device 102 via left-eye lens 104L and right-eye lens 104R.

As will be described in greater detail below, each of left-eye pixel array 122L and right-eye pixel array 122R may include a plurality of pixels and subpixels that are operable to generate visible images. Display panel 118 may be an LCD display panel, such as a backlit LCD display panel that modulates emitted light through an active matrix liquid crystal pixel array. Display system 100 may also include any other suitable type of display panel, such as, for example, an organic light-emitting diode (LED) display panel (e.g., an active-matrix OLED display panel), a plasma display panel, an electrophoretic display panel, an electrowetting display panel, a cathode ray display panel, and/or any other suitable image display panel.

Images may be generated by driving one or more pixels or subpixels of each of arrays 122L and 122R at different currents and/or voltages such that different amounts of light are emitted from each of the pixels or subpixels. For example, selected voltages may be applied to/within subpixel regions of a liquid crystal layer of display panel 118 to allow passage of various amounts of light. A wide variety visible colors may be produced by combining different amounts of light passed through subpixel color regions (e.g., red, green, and/or blue color regions) of a color filter array layer such that a user perceives colors corresponding to the combinations of the subpixel colors.

As shown in FIG. 3, head-mountable display device 102 of system 100 may include a display driver circuit 124 for driving pixels or subpixels of left-eye array 122L and right-eye display array 122R of display panel 118. Display driver circuit 124 may include any suitable circuitry for driving display panel 118. For example, display driver circuit 124 may include at least one display driver integrated circuit (IC). In some examples, display driver circuit 124 may include timing controller (TCON) circuitry that receives commands and/or imaging data and generates horizontal and vertical timing signals for thin-film-transistors (TFTs) of a TFT array of display panel 118. Display driver circuit 124 may, for example, be mounted on an edge of a TFT substrate of display panel 118 and electrically connected to scan lines and data lines of a TFT subpixel array, as described in further detail hereinafter.

Computing device 126 of display system 100 may communicate with display driver circuit 124 of head-mountable display device 102. For example, computing device 126 may send image data (video data, still image data, etc.) to display driver circuit 124. Such image data may be utilized by display driver circuit 124 to generate signals that are transmitted left-eye array 122L and right-eye display array 122R to generate corresponding images for the left and right eyes of the user. Computing device 126 may communicate with display driver circuit 124 via any suitable wired and/or a wireless connection.

Computing device 126 may also include a graphics processing unit (GPU) 128, a central processing unit (CPU) 130, one or more application specific integrated circuitry (ASICs) 132, system memory 134 (e.g., volatile and/or non-volatile memory), and input/output components 136 such as displays, touch-screens, a mouse, a keyboard, a touch sensor, or the like. GPU 128 may process and/or manipulate image data generated by CPU 130 and/or ASIC(s) 132 (e.g., in association with a VR, MR, or AR application running on CPU 130) prior to sending image data to display driver circuit 124 of head-mountable display device 102. For example, GPU 128 may modify initial image data generated by CPU 130 to generate modified image data that is properly oriented for display by left-eye array 122L and right-eye display array 122R.

CPU 130, GPU 128, and/or ASICs 132 may include one or more of a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity or combination of entities that can perform calculations or other manipulations of information.

System memory 134 may include one or more of a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device for storing information and instructions to be executed (e.g., by CPU 130). The CPU 130 and the memory 134 can be supplemented by, or incorporated in, special purpose logic circuitry. The components of the system 100 can be interconnected to external computing systems by any form or medium of digital data communication (e.g., a communication network). The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Example Display Panel

Figure 4:
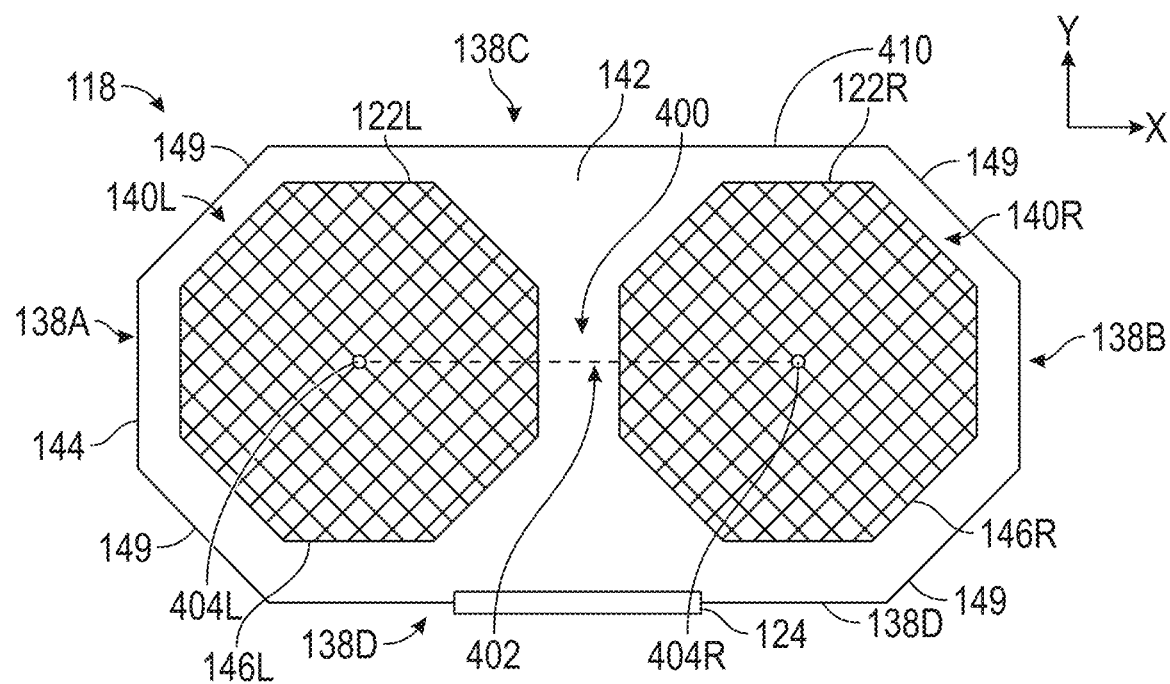
FIG. 4 illustrates a display panel having left and right rotated display pixel arrays, in accordance with aspects of the disclosure.

FIG. 4 shows a front view of an exemplary display panel 118 that may be included in a display device, such as head-mountable display device 102. As shown FIG. 4, left-eye array 122L and right-eye display array 122R are spatially separated, along the X-direction in the figure, on a common substrate 410 and arranged to be visible to a user's left and right eyes. The X-direction of the display panel 118 may be defined to be a direction parallel to a straight line 402 extending between the center 404L of the left-eye pixel array 122L and the center 404R of the right-eye pixel array 122R. The Y-direction of the display panel may be defined to be the direction, in the plane of the display panel, perpendicular to the X-direction.

Left-eye array 122L and right-eye display array 122R may respectively include display circuitry 140L and display circuitry 140R for operating the display pixels of left-eye array 122L and right-eye display array 122R. Display circuitry 140L and display circuitry 140R may each include an array of pixel circuits arranged along a plurality of parallel scan lines and a plurality of parallel data lines for driving pixels or subpixels of left-eye array 122L and right-eye display array 122R in accordance with scan signals and data signals from display driver circuit 124.

For example, each subpixel may have a corresponding pixel circuit that includes a thin-film transistor (TFT), a pixel electrode coupled to the TFT, and at least a portion of a common electrode that carries a common voltage (Vcom) for all pixels of the array. Left-eye array 122L and right-eye display array 122R may each include a plurality of pixels and subpixels that emit light from a front surface 142 of display panel 118 such that images formed by the pixels and/or subpixels are visible to a user viewing front surface 142.

As shown in the example of FIG. 4, display panel 118 may have a nonrectangular shape and/or periphery. For example, display panel 118 may have a peripheral edge 144 surrounding front surface 142, left-eye array 122L, and right-eye array 122R. Peripheral edge 144 may form, for example, an eight-sided periphery of display panel 118 that peripherally surrounds and/or abuts front surface 142. As shown, each of left-eye array 122L right-eye array 122R may have an octagonal periphery. In various examples, display panel 118 may extend longitudinally between a left edge 138A and a right edge 138B, with left-eye array 122L and right-eye array 122R arranged apart from each other in the longitudinal direction parallel to the X-axis shown in FIG. 4. Peripheral edges 144 of display panel 118 may include one or more canted edges 149 extending obliquely between various side surface portions of peripheral edge 144. For example, canted edges 149 may extend between left edge 138A and each of upper edge 138C and lower edge 138D of display panel 118. Additionally or alternatively, canted edges 149 may extend between right edge 138B and each of upper edge 138C and lower edge 138D of display panel 118.

In some examples, left-eye array 122L and/or right-eye array 122R may also include a nonrectangular periphery. For example, perimeter 146L of left-eye array 122L and perimeter 146R of right-eye array 122R may each be an octagonal perimeter that includes portions that extend parallel or substantially parallel to various sides of display panel 118 (e.g., left edge 138A, right edge 138B, upper edge 138C, lower edge 138D, and/or one or more canted edges 149).

As shown in the example of FIG. 4, display driver circuit 124 may be disposed adjacent to a lower peripheral edge 138D of display panel 118. Display driver circuit 124 may extend longitudinally along lower peripheral edge 138D in a direction parallel to the X-axis shown in FIG. 4. Accordingly, display driver circuit 124 may extend near each of left-eye array 122L and right-eye array 122R as well as near a non-display region 400 (e.g., a region that is free of display pixels or that includes non-active display pixels) located between left-eye array 122L and right-eye array 122R.

Figure 5:
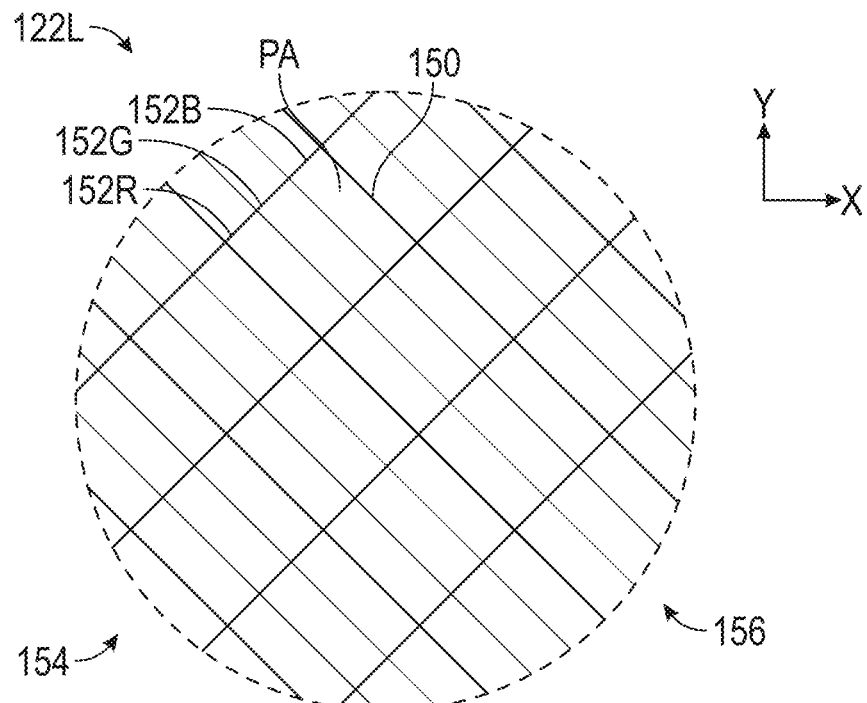
FIG. 5 illustrates a close-up view of a portion of a pixel array of the display panel of FIG. 4, in accordance with aspects of the disclosure.

FIG. 5 shows a close-up view of a portion left-eye array 122L of display panel 118. While FIG. 5 illustrates a portion of left-eye array 122L, it should be appreciated that right-eye array 122R may have an array of pixels and subpixels that is similar to that shown in FIG. 5, but rotated ninety degrees with respect to the rotation depicted in FIG. 5 (see FIG. 4). As shown FIG. 5, left-eye array 122L may include a plurality of pixels 150. Each pixel 150 may include a plurality of subpixels, such as a first subpixel 152R (e.g., a red colored subpixel), second subpixel 152G (e.g., a green colored subpixel), and a third subpixel 152B (e.g., a blue colored subpixel). First subpixel 152R, second subpixel 152G, and third subpixel 152B of each pixel 150 may be individually driven by display circuitry 140L to form a color image that is visible to the human eye.

Each of first subpixel 152R, second subpixel 152G, and a third subpixel 152B may emit light having a separate wavelength and/or range of wavelengths. For example, each first subpixel 152R may emit light having a first wavelength and/or range of wavelengths (e.g., red light), each second subpixel 152G may emit light having a second wavelength and/or range of wavelengths (e.g., green light), and each third subpixel 152B may emit light having a third wavelength and/or range of wavelengths (e.g., blue light). Additionally or alternatively, pixels 150 may include subpixels that emit light any other suitable visible light colors, including, for example, cyan and/or magenta light. In some examples, each pixel 150 may include one or more additional subpixels that emit one or more colors corresponding to those emitted by first subpixel 152R, second subpixel 152G, and/or third subpixel 152B and/or other colors and/or ranges of colors. In the example of FIG. 5, first subpixel 152R, second subpixel 152G, and third subpixel 152B each have a pixel area PA with a rectangular or generally rectangular periphery with an elongate dimension that is arranged along a dimension that extends at an oblique angle with respect to the X-axis of FIGS. 4 and 5 (e.g., along a dimension parallel to the parallel data lines of left-eye array 122L).

As indicated in FIGS. 4 and 5, pixels 150 may be arranged in a plurality of pixel rows 154 and a plurality of pixel columns 156. Pixel rows 154 and pixel columns 156 may extend in directions that are nonparallel to the primary edges (e.g., left edge 138A, right edge 138B, upper edge 138C, and lower edge 138D) of display panel 118 that extend parallel or substantially parallel to the X- and Y-axes shown in FIG. 4. In some examples, images may be produced by driving first subpixels 152R, second subpixels 152G, and third subpixels 152B of pixels 150 at different currents and/or voltages such that various amounts of light are emitted from each first subpixel 152R, second subpixel 152G, and a third subpixel 152B. Different visible colors may be produced by combining selected amounts of emitted light from adjacent subpixels of different colors (e.g., red, green, and/or blue subpixels) such that a user perceives pixel colors corresponding to the combinations of subpixels. As discussed in further detail hereinafter, the plurality of pixel rows 154 and the plurality of pixel columns 156 of left-eye array 122L and right-eye array 122R may each extend obliquely relative to lower peripheral edge 138D of front surface 142.

Figure 6:
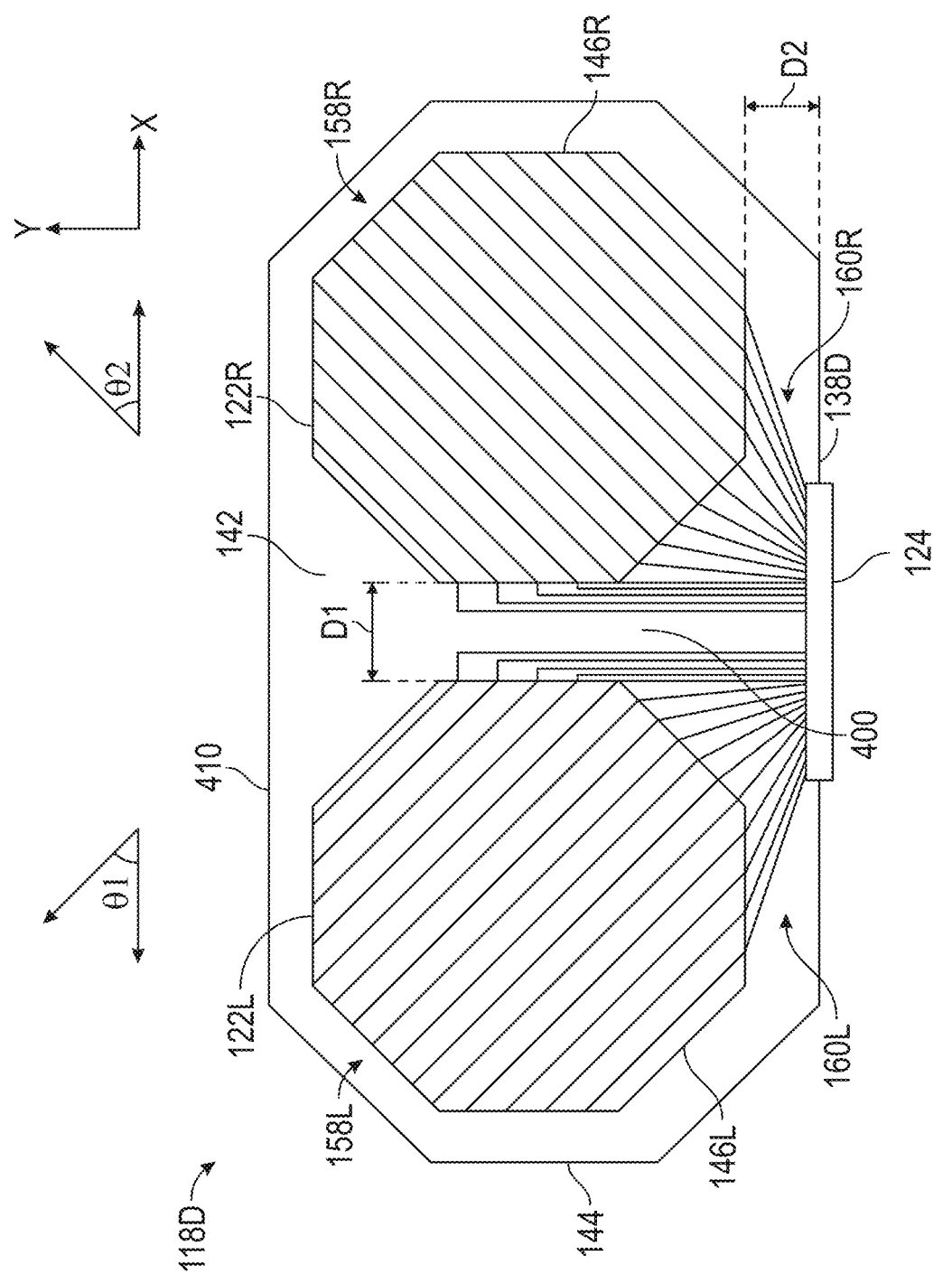
FIG. 6 illustrates an exemplary layout of data lines in the display panel of FIG. 4, in accordance with aspects of the disclosure.
Figure 7:
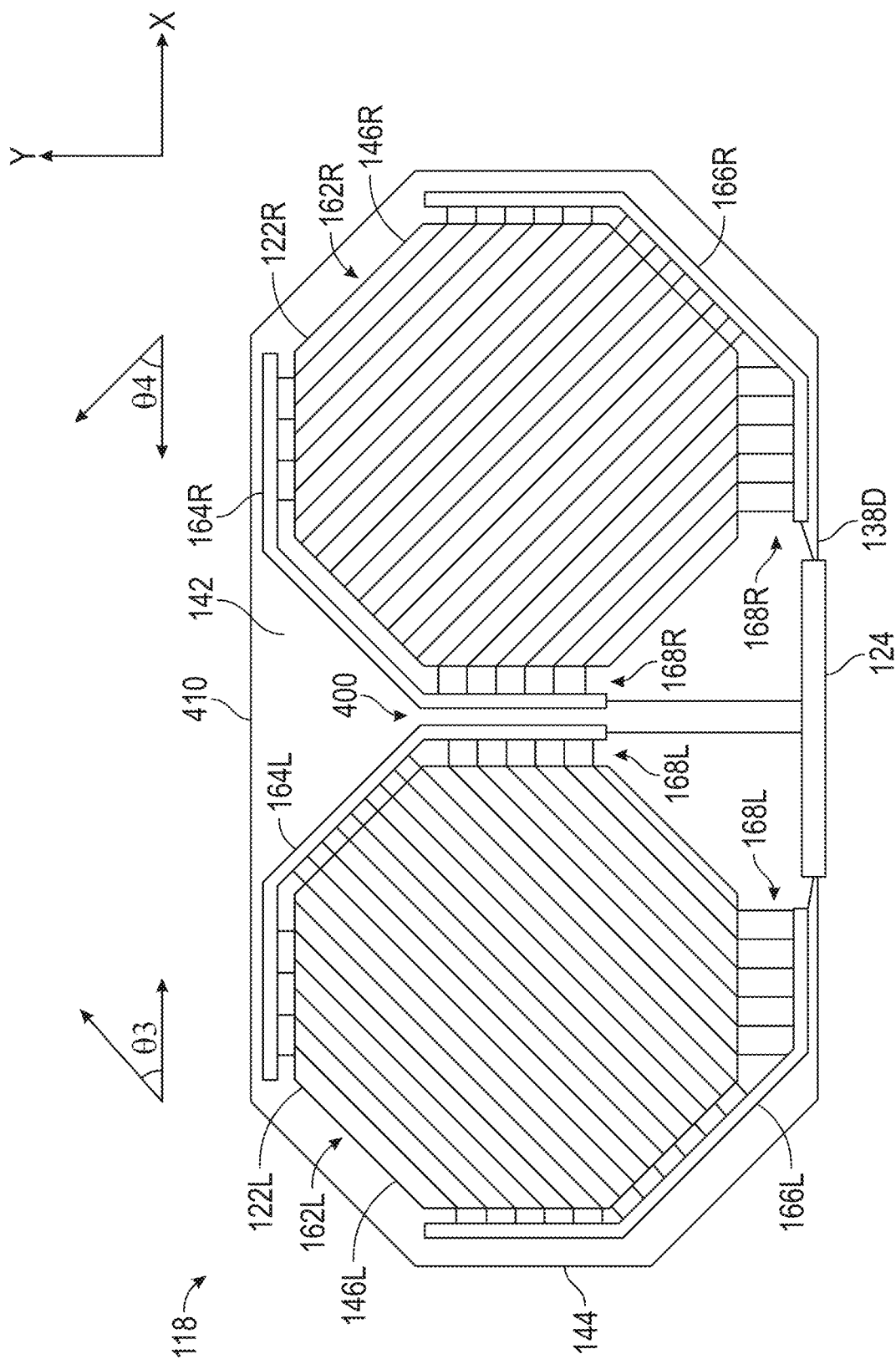
FIG. 7 illustrates an exemplary layout of gate lines in the display panel of FIG. 4, in accordance with aspects of the disclosure.

FIGS. 6 and 7 show front views of display panel 118 with various components of display panel 118 omitted to allow other components to be visible for clarity of the discussion. In particular, FIG. 6 illustrates data (or source) driver circuitry that may be included in display panel 118, and FIG. 7 illustrates corresponding scan (or gate) driver circuitry included in display panel 118.

As shown in the example of FIG. 6, left-eye array 122L may include a plurality of data lines 158L and right-eye array 122R may include a plurality of data lines 158R. Data lines 158L and data lines 158R may each extend parallel to corresponding pixel columns (e.g., pixel columns 156 shown in FIG. 5), respectively, of left-eye array 122L and right-eye array 122R. Data lines 158L and data lines 158R may extend obliquely relative to sides (e.g., left edge 138A, right edge 138B, upper edge 138C, and lower edge 138D) of display panel 118 that are parallel to the X- and Y-axes shown in FIG. 6. In some examples, data lines 158L and data lines 158R may each extend obliquely relative to lower peripheral edge 138D, which is parallel to the X-axis. For example, data lines 158L may each extend at an angle Θ1 from the X-axis and data lines 158R may each extend at an angle Θ2 from the X-axis. Angle Θ1 and angle Θ2 may each be any suitable angles greater than 0 degrees and less than 90 degrees. For example, angle Θ1 and angle Θ2 may each be 45 degrees or approximately 45 degrees. In at least one embodiment, data lines 158L of left-eye array 122L may extend in a different direction than data lines 158R of right-eye array 122R. For example, data lines 158L may each extend at a 90 degree angle or approximately a 90 degree angle relative to data lines 158R.

Data lines 158L of left-eye array 122L may be electrically coupled to display driver circuit 124 via corresponding connecting lines 160L. Additionally, data lines 158R of right-eye array 122R may be electrically coupled to display driver circuit 124 via corresponding connecting lines 160R. Connecting lines 160L and connecting lines 160R may respectively extend between display driver circuit 124 and terminal ends of data lines 158L and data lines 158R located at portions of perimeter 146L and perimeter 146R of left-eye array 122L and right-eye array 122R, respectively. Accordingly, display driver circuit 124 may send driving signals to data lines 158L and data lines 158R via connecting lines 160L and connecting lines 160R, respectively. Connecting lines 160L and connecting lines 160R may be disposed in various non-display regions of display panel 118. For example, some of connecting lines 160L and connecting lines 160R may be disposed in a non-display region 400 of display panel 118 located between left-eye array 122L and right-eye array 122R.

Left-eye array 122L and right-eye array 122R may be positioned apart from one another by a distance D1 in the longitudinal direction of display panel 118 (e.g., parallel to the X-axis). Distance D1 may provide a margin between left-eye array 122L and right-eye array 122R that is sufficient to fit connecting lines 160L and connecting lines 160R extending to corresponding portions of left-eye array 122L and right-eye array 122R. Additionally, the distance D1 may provide sufficient space to accommodate at least a portion of at least one gate circuit, as will be described in greater detail in reference to FIG. 7.

As shown in FIG. 6, some of connecting lines 160L may be disposed in a non-display region of display panel 118 located between left-eye array 122L and lower peripheral edge 138D. Additionally, some of connecting lines 160R may be disposed in a non-display region of display panel 118 located between right-eye array 122R and lower peripheral edge 138D. Left-eye array 122L and right-eye array 122R may each be positioned apart from lower peripheral edge 138D of front surface 142 by a distance D2 (e.g., in a direction parallel to the Y-axis shown in the figures). Distance D2 may provide a margin between lower peripheral edge 138D and each of left-eye array 122L and right-eye array 122R that is sufficient to accommodate connecting lines 160L and connecting lines 160R extending to corresponding portions of left-eye array 122L and right-eye array 122R. Additionally, the distance D2 may provide sufficient space to accommodate at least a portion of at least one gate circuit, as will be described in greater detail in reference to FIG. 7.

The orientations of data lines 158L and data lines 158R shown in FIG. 6 may allow for a margin between lower peripheral edge 138D and each of left-eye array 122L and right-eye array 122R to be reduced in comparison to other data line orientations, such as orientations in which the data lines each extend parallel to the Y-axis, since fewer connecting lines 160L and connecting lines 160R extend between lower peripheral edge 138D and a lower perimeter portion of each of left-eye array 122L and right-eye array 122R. Accordingly, a peripheral size of display panel 118 may be reduced by such a configuration, allowing for display panel 118 to be utilized in, for example, headsets have been a reduced form factor. Additionally, orientations of data lines 158L and data lines 158R shown in FIG. 6 may allow for a driving or loading gap between first and last data lines of each of left-eye array 122L and right-eye array 122R to be reduced in comparison to other data line orientations due to the relatively close proximity of display driver circuit 124 to each of the terminal connection portions of data lines 158L and data lines 158R. For example, the terminal connection portions may disposed on perimeter sides of left-eye array 122L and right-eye array 122R that are angled toward or generally toward display driver circuit 124 as shown in FIG. 6. Accordingly, driving uniformity of left-eye array 122L and right-eye array 122R may be improved due to the reduced driving gaps without requiring the use of an additional display driver circuit.

FIG. 7 shows scan (or gate) driver circuitry included in display panel 118 (data driver circuitry illustrated in FIG. 6 is not shown in FIG. 7 merely for clarity of the discussion). As illustrated in FIG. 7, left-eye array 122L may include a plurality of scan lines 162L and right-eye array 122R may include a plurality of scan lines 162R. Scan lines 162L and scan lines 162R each extend parallel to corresponding pixel rows (e.g., pixel rows 154 shown in FIG. 5) of left-eye array 122L and right-eye array 122R, respectively. Scan lines 162L and scan lines 162R may extend obliquely relative to sides (e.g., left edge 138A, right edge 138B, upper edge 138C, and lower edge 138D) of display panel 118 that are parallel to the X- and Y-axes shown in FIG. 6.

In some examples, scan lines 162L and scan lines 162R may each extend obliquely relative to lower peripheral edge 138D of front surface 142, which is parallel to the X-axis in FIG. 7. For example, scan lines 162L may each extend at an angle Θ3 from the X-axis and scan lines 162R may each extend at an angle Θ4 from the X-axis. Angle Θ3 and angle Θ4 may each be any suitable angles greater than 0 degrees. For example, angle Θ3 and angle Θ4 may each be 45 degrees or approximately 45 degrees. In at least one embodiment, scan lines 162L of left-eye array 122L may extend in a different direction than scan lines 162R of right-eye array 122R. For example, scan lines 162L may each extend at a 90 degree angle or approximately a 90 degree angle relative to scan lines 162R. Further, scan lines 162L may each extend at a 90 degree angle or approximately a 90 degree angle relative data lines 158L shown in FIG. 6 and scan lines 162R may each extend at a 90 degree angle or approximately a 90 degree angle relative data lines 158R.

Each subpixel 152R, 152G, and 152B of each pixel 150 (see, FIG. 5) of left-eye array 122L includes a pixel circuit disposed along a scan line 162L and a data line 158L. Each subpixel 152R, 152G, and 152B of each pixel 150 (see, FIG. 5) right-eye array 122R includes a pixel circuit disposed along a scan line 162R and a data line 158R. The pixel area PA (see, FIG. 5) of each sub-pixel may be defined, for example, by an area between two adjacent data lines and two adjacent scan lines.

As shown in the example of FIG. 7, scan lines 162L of left-eye array 122L may each be electrically coupled to display driver circuit 124 via a corresponding upper gate driver circuit 164L or lower gate driver circuit 166L and a corresponding connecting line 168L. Scan lines 162R of right-eye array 122R may each be electrically coupled to display driver circuit 124 via a corresponding upper gate driver circuit 164R or lower gate driver circuit 166R and a corresponding connecting line 168R. Connecting lines 168L and connecting lines 168R may respectively extend between the gate driver circuits (upper gate driver circuits 164L and 164R and lower gate driver circuits 166L and 166R) and terminal ends of scan lines 162L and scan lines 162R at portions of perimeter 146L and perimeter 146R of left-eye array 122L and right-eye array 122R, respectively. Display driver circuit 124 may send scan signals to scan lines 162L and scan lines 162R via the gate driver circuits and connecting lines 168L and connecting lines 168R, respectively. Connecting lines 168L and 168R, upper gate driver circuits 164L and 164R, and lower gate driver circuits 166L and 166R may be disposed in various non-display regions of display panel 118 surrounding left-eye array 122L and right-eye array 122R. In some embodiments, upper gate driver circuits 164L and 164R and lower gate driver circuits 166L and 166R may be arranged so as to not overlap connecting lines 160L and connecting lines 160R (see FIG. 6). In some examples, upper gate driver circuits 164L and 164R and lower gate driver circuits 166L and 166R may have a narrow width allowing for margins surrounding left-eye array 122L and right-eye array 122R between a periphery of front surface 142 and each of left-eye array 122L and right-eye array 122R to be minimized. Accordingly, a peripheral size of display panel 118 may be reduced by such a configuration.

Due to the rotation of arrays 122L and 122R (as described in connection with FIGS. 4-7) relative to the conventional x-y oriented display of, for example, televisions and portable computers, CPU 130 and/or GPU 128 may rotate image data differently for each of arrays 122L and 122R to produce images on display panel 118 that are in a desired orientation. For example, images that are generated based on image data configured for display on conventional display panels may appear rotated in left-eye array 122L and right-eye array 122R of display panel 118 if the image data is displayed without modification. This is because such conventional image data may be configured for display on display panels having pixels arranged in horizontal rows and vertical columns that extend, for example, parallel to rectangular sides of the display panels. However, as described above, left-eye array 122L and right-eye array 122R of display panel 118 may include pixels that are arranged along pixel rows and pixel columns (see, e.g., pixel rows 154 and pixel columns 156 of FIG. 5) that extend in directions that are nonparallel to horizontal and vertical sides of the display panels. For example, pixel rows and pixel columns of left-eye array 122L and right-eye array 122R may be respectively arranged parallel to scan lines 162L and scan lines 162R and data lines 158L and data lines 158R such that the pixel rows and pixel columns each extend at an oblique angle (e.g., 45 degrees) with respect to the horizontal and vertical directions. Accordingly, unmodified image data would each appear a user to be tilted at oblique angles (e.g., of 45 degrees) with respect to the horizontal and vertical directions represented by the X- and Y-axes. Additionally, unmodified left-eye images and unmodified right-eye images would appear to be angled with respect to each other by an angle of 90 degrees.

In order to properly orient and display images in left-eye array 122L and right-eye array 122R, image data (e.g., initial image data) that is configured for displaying images on conventional displays may be modified by, for example, by GPU 128 to generate modified image data. GPU 128 may be configured to, for example, generate modified image data that results in images being displayed in left-eye array 122L and right-eye array 122R of display panel 118 in their proper orientations. For example, supplying display driver circuit 124 with modified image data may result in the orientations of modified left-eye images and modified right-eye images appearing respectively rotated relative to the orientations of unmodified left-eye images and unmodified right-eye images generated based on unmodified conventional image data. For example, modified left-eye images may be rotated 45 degrees counter-clockwise with respect to unmodified left-eye images. Additionally, modified right-eye images may be rotated 45 degrees clockwise with respect to unmodified right-eye images.

Figure 8:
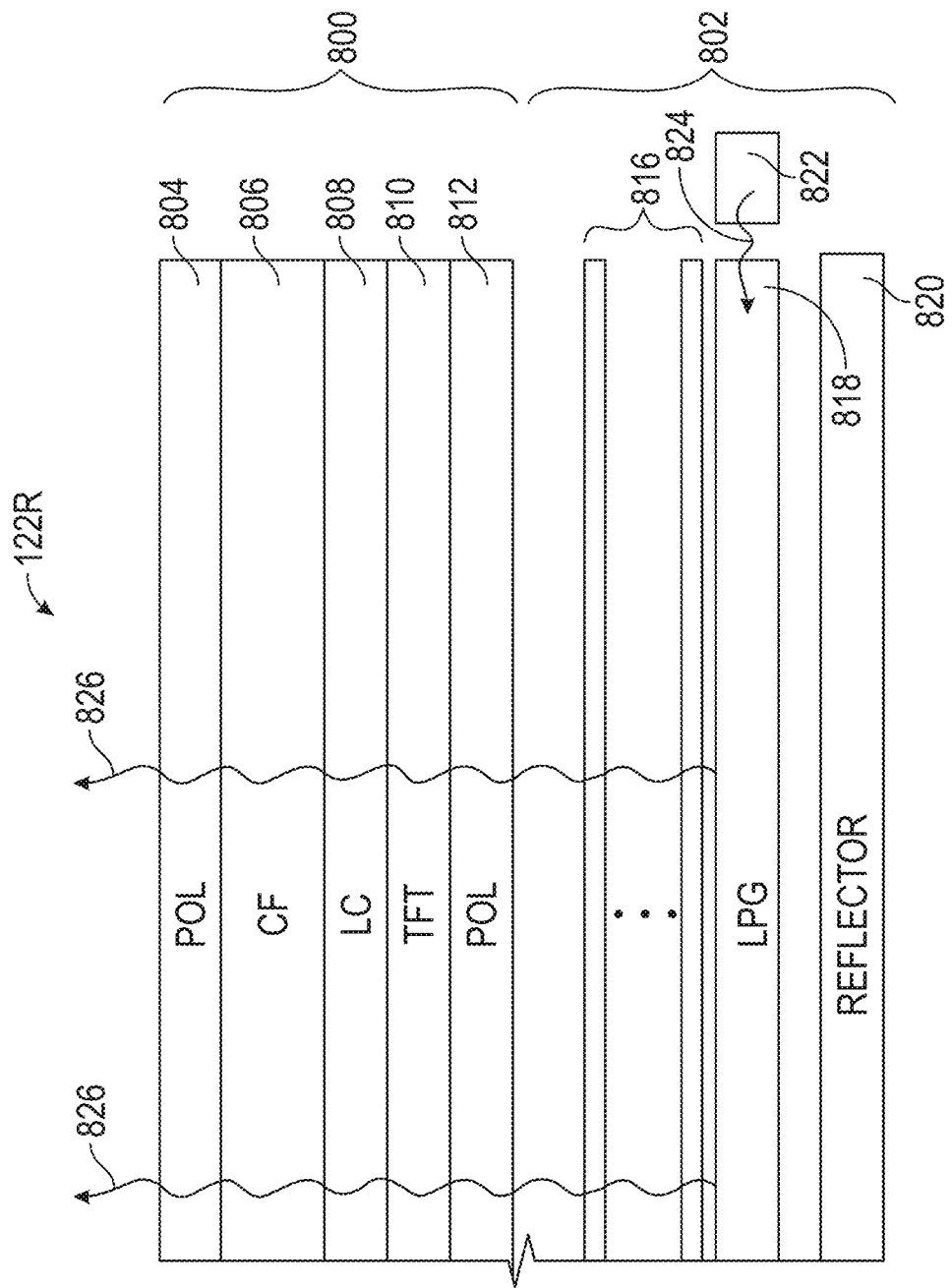
FIG. 8 illustrates a schematic side view of a portion of a display panel, in accordance with aspects of the disclosure.

FIG. 8 illustrates a schematic side view of a portion of right eye array 122R, according to some aspects of the disclosure. While FIG. 8 illustrates the vertical structure of a portion of right-eye array 122R, it should be appreciated that left-eye array 122L may have a vertical structure that is the same or similar to the vertical structure shown in FIG. 8. In particular, FIG. 8 shows how right-eye array 122R (and/or left-eye array 122L) can include a liquid crystal display unit 800 and a backlight unit 802. Liquid crystal layer 808 of LCD unit 800, in the example of FIG. 8, is formed between a color filter layer 806 and thin-film transistor (TFT) layer 810 (sometimes referred to herein a control circuitry layer). Layers 806 and 810 may each be formed on a transparent substrate such as a glass substrate.

As shown, liquid crystal layer 808, color filter layer 806, and thin-film transistor layer 810 may be arranged between light polarizing layers such as upper polarizer 804 and lower polarizer 812. The polarization direction of top polarizer 804 may be parallel to the polarization direction of bottom polarizer 812, perpendicular to the polarization direction of bottom polarizer 812, or at an oblique angle relative to the polarization direction of bottom polarizer 812. In one suitable example, one of polarizers 804 and 812 may have a polarization direction aligned with the X-axis of the display panel 118 and the other of polarizers 804 and 812 may have a polarization direction that is aligned with the Y-axis of the display panel. In another example, both of polarizers 804 and 812 may have a polarization direction that is aligned with the Y-axis of the display. In another example, both of polarizers 804 and 812 may have a polarization direction that is aligned with the X-axis of the display.

For example, as discussed in further detail hereinafter, one or more pixel electrodes of each pixel 150 or subpixel 152 may be operated to apply an electric field to the liquid crystal molecules of the liquid crystal layer 808 within that pixel or subpixel. In one exemplary arrangement, the electric field may be controlled by pixel electrodes on opposing sides of the liquid crystal layer to controllably rotate the orientation of the liquid crystal molecules, thereby producing a rotation of light polarization between two crossed polarizers 804 and 812, allowing light to pass through both crossed polarizers and thus turning the pixel or subpixel "on". When the pixel or subpixel is off, providing two crossed polarizers 804 and 812, as in this example, provides a "black" background. In another exemplary arrangement that is discussed in further detail hereinafter, upper polarizer 804 and lower polarizer 812 may have polarization directions that are parallel to each other, with the liquid crystal molecules adjacent to bottom polarizer 812 having a default orientation (e.g., caused by an alignment layer on TFT layer 810 as described hereinafter) that is perpendicular to the polarization direction of the lower polarizer 812, and with the liquid crystal molecules adjacent to top polarizer 804 having a default orientation (e.g., caused by an alignment layer on color filter layer 806 as described hereinafter) that is parallel to the polarization direction of the top polarizer 804. In this arrangement, operation of a pixel electrode on TFT layer 810 rotates the liquid crystal molecules adjacent TFT layer 810 away from their default orientation into alignment with the liquid crystal molecules adjacent color filter layer 806, to allow light to pass through the two aligned polarizers and the liquid crystal layer 808, thereby turning the pixel or subpixel "on".

Backlight unit 802 may include a light guide plate such as light guide plate 818 that guides light using internal reflections within plate 818. During operation of backlight unit 802, a light source such as light source 822 (e.g., one or more light-emitting diodes) may generate light 824 that is distributed throughout light guide plate 818 due to total internal reflection within the plate. Light guide plate 818 may include light-scattering features that redirect light 824 out of the light guide plate. Light 824 that scatters upwards from light guide plate 818 may serve as display light 826 for array 122R. Light 824 that scatters downwards may be reflected back in the upwards direction by reflector 820 to form additional display light 826. As shown, backlight unit 802 may include one or more optical films 816 (e.g., diffuser layers, or the like).

Color filter layer 806 and/or control circuitry layer 810 may include an alignment layer adjacent to liquid crystal layer 808 that causes the liquid crystal molecules in the liquid crystal layer to align in a preferred default orientation. The orientation of the liquid crystal molecules can be modified, from this preferred default orientation, by operation of a pixel circuit, to control the amount of the display light 826 that has passed through polarizer 812 that can also pass through polarizer 804 and exit the display for viewing by the user. Based on this control of the liquid crystal orientation by the pixel circuits, display light 826 that is generated by backlight unit 802 passes through light guide layer 818, through LCD unit 800, and selectively out of array 122R through lens 104R to be viewed by a wearer of head-mountable display device 102.

Figure 9:
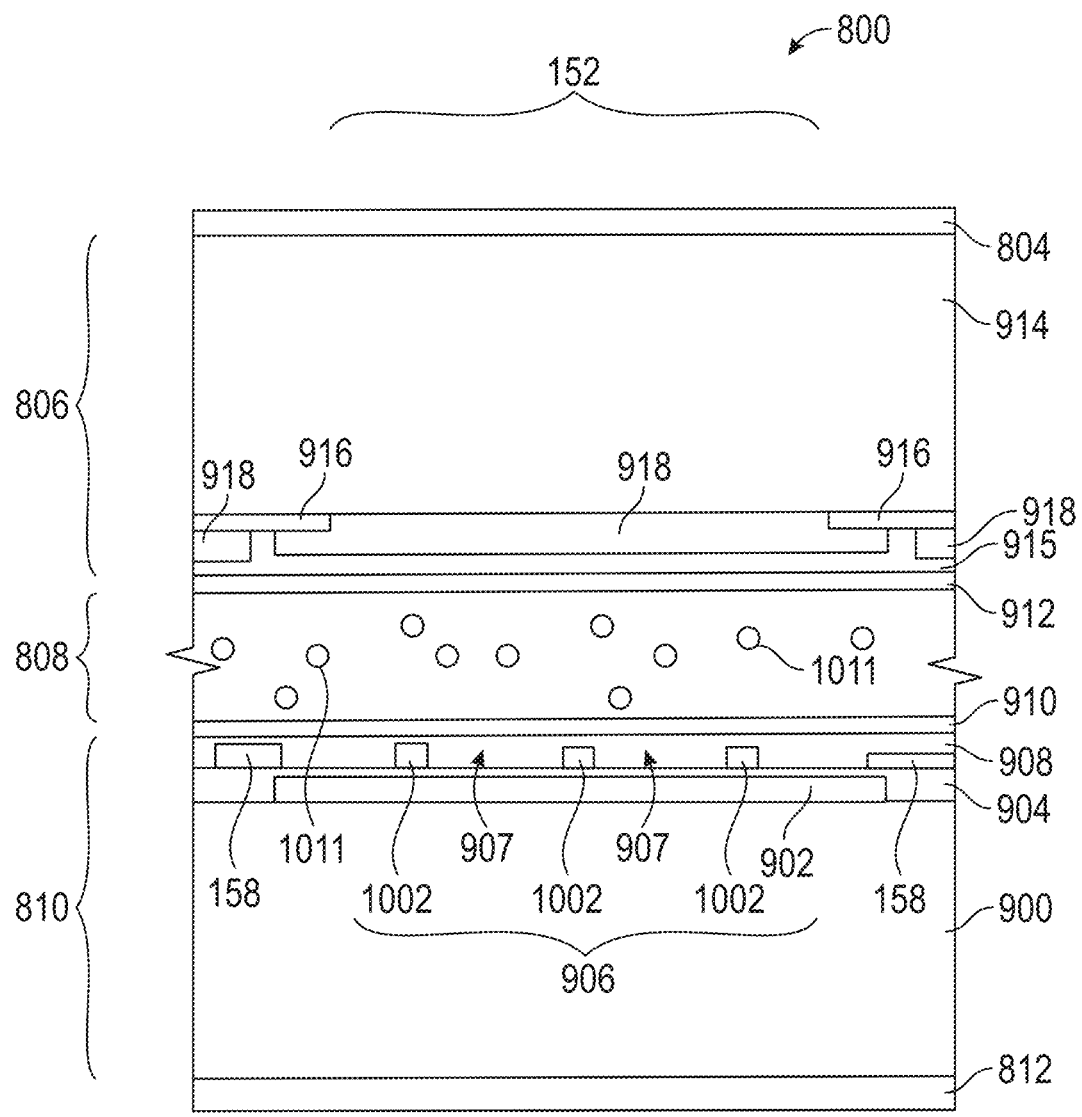
FIG. 9 illustrates a schematic side view of a portion of a display panel showing further details of a control circuitry layer and alignment layers of the display panel, in accordance with aspects of the disclosure.

For example, FIG. 9 illustrates a schematic cross-sectional side view of a portion of liquid crystal display unit 800 corresponding to a single subpixel 152. In the example of FIG. 9, a first alignment layer 910 is formed on control circuitry layer 810 adjacent to a first surface of liquid crystal layer 808, and a second alignment layer 912 is formed on a lower surface of color filter layer 806, adjacent to an opposing second surface of liquid crystal layer 808.

Each of alignment layers 910 and 912 may be formed, for example, from a thin polymer film such as a polyimide film that has been treated with a light treatment, a rubbing treatment, or other suitable treatment that generates surface features that cause the alignment of the liquid crystal molecules adjacent to that film to align in the preferred default direction. The preferred default orientation of the liquid crystals may be, for example, an orientation that is aligned with an elongate dimension of the pixel area, or another preferred default orientation as described in further detail hereinafter. The preferred default orientation may be an orientation in which the liquid crystal molecules adjacent to the alignment film align in the absence of an applied electric field such as an electric field from a pixel electrode.

The alignment features of bottom alignment layer 910 may be parallel to the alignment features of top alignment layer 912, perpendicular to the alignment features of top alignment layer 912, or at an oblique angle relative to the alignment features of top alignment layer 912. Resultingly, the liquid crystal molecules 1011 in liquid crystal layer 808 that are adjacent to bottom alignment layer 910 may have a default orientation that is parallel to the default orientation of the liquid crystal molecules 1011 adjacent top alignment layer 912, perpendicular to the default orientation of the liquid crystal molecules 1011 adjacent top alignment layer 912, or at an oblique angle relative to the default orientation of the liquid crystal molecules 1011 adjacent top alignment layer 912. In one example, liquid crystal molecules 1011 may be aligned by their adjacent alignment layer adjacent alignment layer to be parallel or perpendicular to the direction of polarization of one or both of polarizers 804 and 812.

For example, in one suitable implementation, polarizers 804 and 812 each have a polarization direction that is aligned with the X-axis of display panel 118 (see, e.g., FIG. 2 or 4-7), alignment layer 910 aligns the default orientation of liquid crystal molecules 1011 adjacent that alignment layer perpendicularly to the polarization direction of the polarizers (e.g., parallel to the Y-axis) of the display panel, and alignment layer 912 aligns default orientation of liquid crystal molecules 1011 adjacent that alignment layer parallel to the polarization direction of the polarizers (e.g., parallel to the X-axis). In this way, when pixel electrode 906 is operated, an electric field is generated in the portion of liquid crystal layer 808 corresponding to that pixel or subpixel that causes the liquid crystal molecules 1011 adjacent alignment layer 910 to rotation into alignment with the liquid crystal molecules 1011 adjacent alignment layer 912 to allow display light to pass through the two aligned polarizers.

The cross-sectional view of FIG. 9 also shows how control circuitry layer 810 may include, within the volume of each subpixel 152, a pixel electrode 906 and at least a portion of a common electrode 902. As shown, pixel electrode 906 may include one or more electrode strips 1002 that are separated, along the surface of a passivation layer 908, by gaps 907, in some implementations. Although common electrode 902 is depicted, in this example, as a monolithic structure within subpixel 152, it should be appreciated that the common electrode may also include electrode strips or other electrode portions separated, along the surface of substrate 900 by gaps. Pixel electrode 906 may be a transparent electrode that is formed from, for example, indium tin oxide or another suitable transparent conductive material. Common electrode 902 may be a transparent electrode that is formed from, for example, indium tin oxide or another suitable transparent conductive material. The pixel electrode may receive, from one of data lines 158, a pixel voltage for controlling the orientation of liquid crystal molecules 1011. Common electrode 902 may receive a common voltage (Vcom) that is common to all subpixels 152 of the pixel array.

In the example of FIG. 9, common electrode 902 is formed on a surface of substrate 900 and covered by an insulating film 904. In this example, pixel electrode 906 and data lines 158 are formed on insulating film 904 and covered by a passivation layer 908 that is interposed between pixel electrode 906 and bottom alignment layer 910. However, it should be appreciated by one of ordinary skill in the art that the specific vertical arrangement of pixel electrode 906, common electrode 902, and one or more insulating films and/or passivation layers can be modified without departing from the scope of the disclosure.

The cross-sectional view of FIG. 9 also shows how color filter layer 806 may include a masking layer 916 and color filter material 918 formed on a bottom surface of substrate 914. In some examples, the pixel area PA described herein can be defined by the area of the opening in mask layer 916 for each pixel. As shown in FIG. 9, the opening in masking layer 916 for each subpixel may be filled with a portion of color filter material 918. As shown, a planarization layer 915 may be interposed between alignment layer 912 and color filter material 918. However, it should be appreciated by one of ordinary skill in the art that the specific vertical arrangement of masking layer 916, color filter material 918, and/or one or more passivation layers and/or other layers can be modified without departing from the scope of the disclosure.

Figure 10:
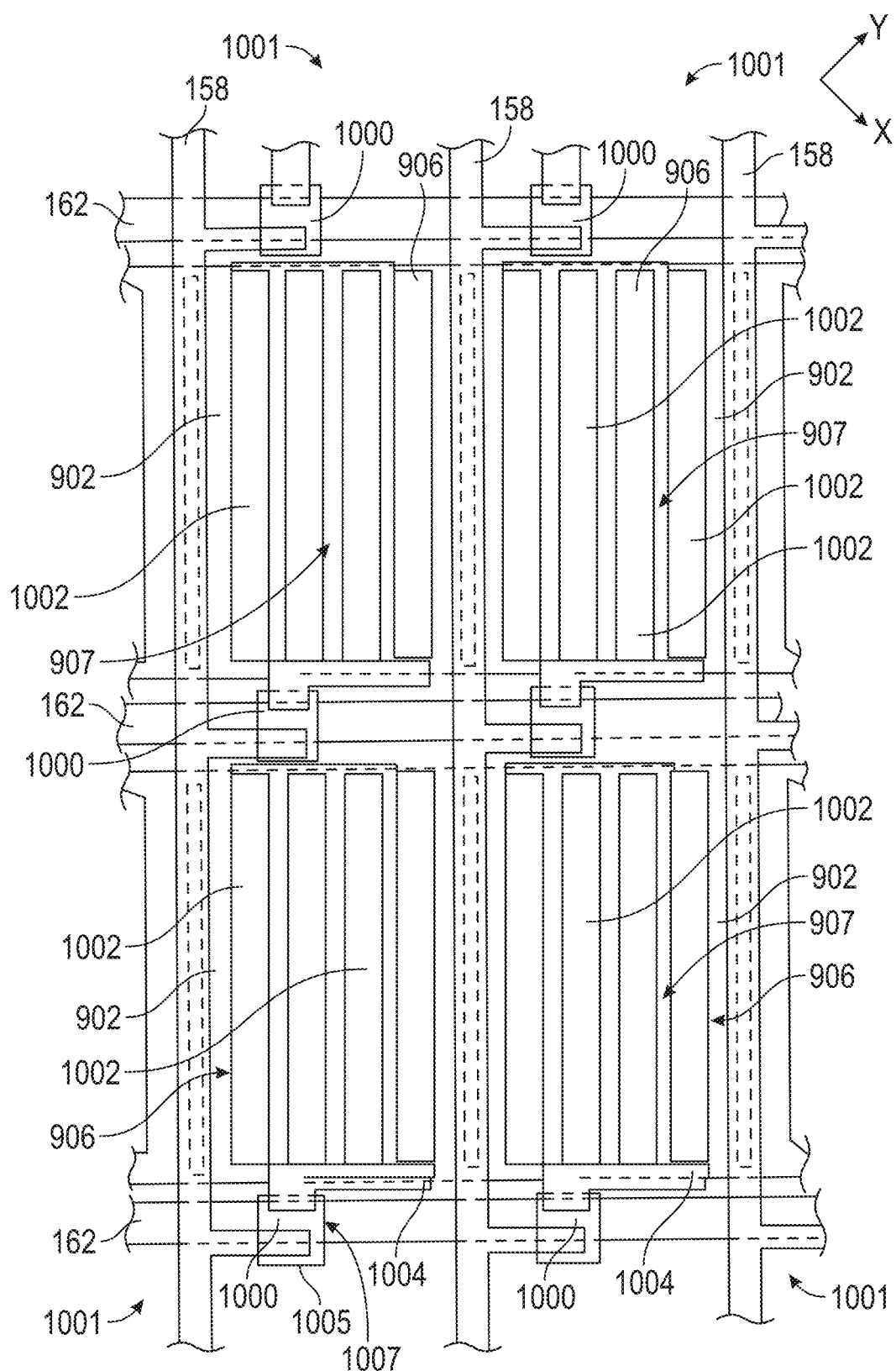
FIG. 10 illustrates and exemplary arrangement of display pixel circuits in a display panel, in accordance with aspects of the disclosure.

FIG. 10 illustrates a top view of four pixel circuits 1001, each corresponding to a subpixel 152, and each including a pixel electrode 906 and a common electrode 902, as described above in connection with FIG. 9. As shown in FIG. 10, each pixel circuit also includes at least one transistor such as transistor 1000. In this example, each pixel electrode 1001 is coupled to a drain terminal 1004 of a corresponding transistor 1000. The source electrode 1005 of each transistor 1000 is coupled to a corresponding one of data lines 158. Each transistor 1000 also include a gate electrode coupled to a corresponding one of gate (scan) lines 162 for activation of that the corresponding pixel circuit 1001 via a scan signal from that gate line 162, that allows delivery of the data signal to the pixel electrode. In the example of FIG. 10, portions of common electrode 902 are visible beneath the electrode strips 1002 of pixel electrode 906.

In the example of FIG. 10, pixel electrodes 906 (including each electrode strip 1002) are aligned with the data lines 158. More specifically, each electrode strip 1002 includes an elongate dimension that extends in a direction that is parallel to the parallel data lines 158. In this configuration, pixel electrodes 906 and electrode strips 1002 extend obliquely relative to sides (e.g., left edge 138A, right edge 138B, upper edge 138C, and lower edge 138D) of display panel 118 that are parallel to the X- and Y-axes.

Figure 11:
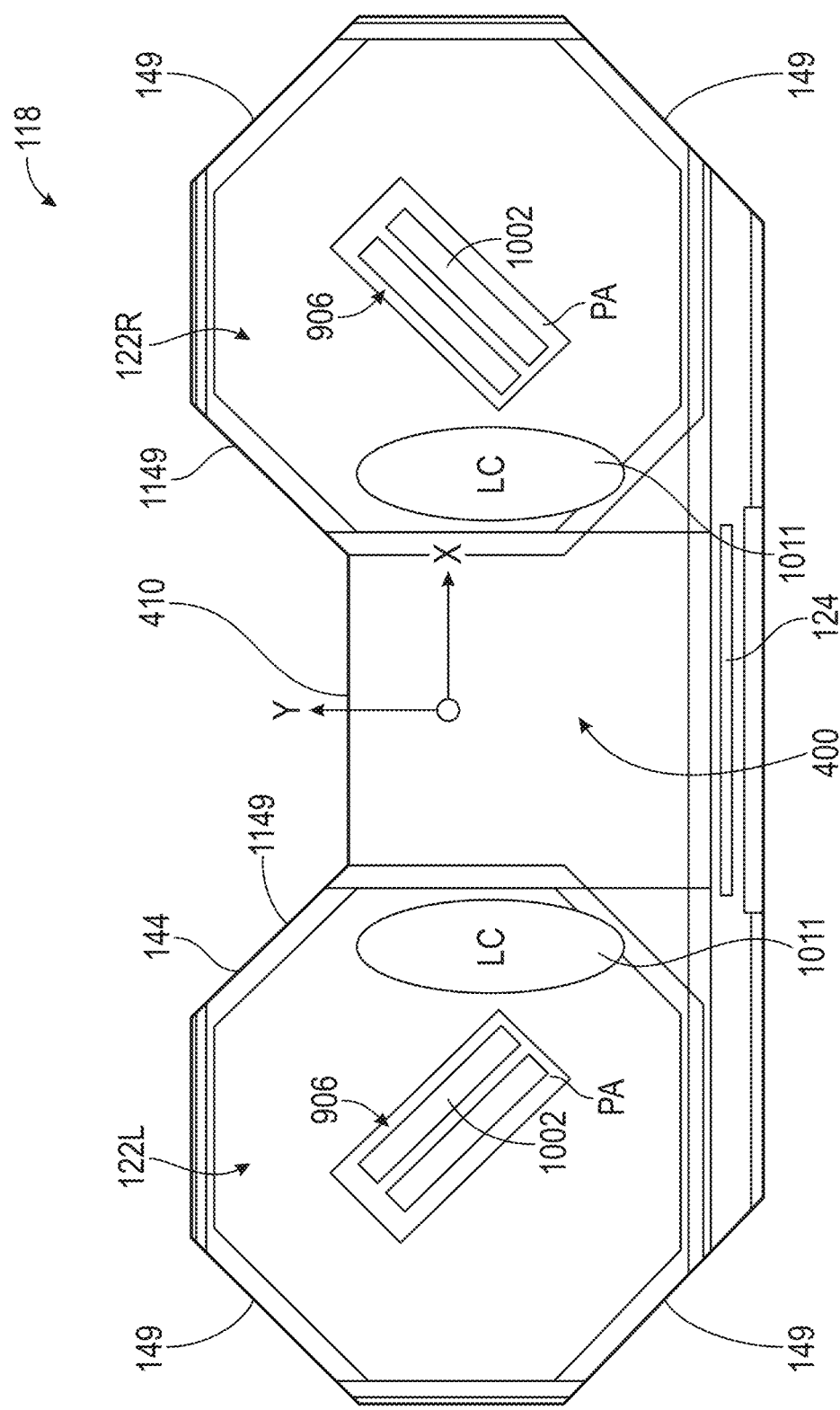
FIG. 11 illustrates an orientation of liquid crystal molecules and pixel electrodes, in accordance with aspects of the disclosure.

FIG. 11 illustrates a top view of the overall display panel 118, with pixel electrodes 906 (including electrode strips 1002) aligned as in the example of FIG. 10. In the example of FIG. 11, display panel 118 includes two additional canted edges 1149 extending obliquely between a top edge portion of peripheral edge 144 and non-display region 400 between arrays 122L and 122R. In FIG. 11, an exaggerated view of a single subpixel 152 of each of left-eye array 122L and right-eye array 122R is shown, indicating the oblique angle between the pixel area PA and pixel electrode 906 (including electrode strips 1002) and the X- and Y-axes of the display panel (as defined herein).

The example of FIG. 11 also illustrates an exaggerated view of a single liquid crystal molecule 1011 shown over each of left-eye array 122L and right-eye array 122R to indicate an exemplary default orientation of the liquid crystal molecules 1011 of each array (e.g., as caused by alignment layers 910 and/or 912 adjacent liquid crystal layer 808 as described above in connection with FIG. 9). In this example, the default orientation of the liquid crystal molecules 1011 of each of left-eye array 122L and right-eye array 122R (e.g., at least the liquid crystal molecules adjacent alignment layer 910) is a common vertical orientation (e.g., an orientation that is parallel to the Y-axis). It can be desirable, for example, for processing simplicity and/or user viewing quality, to have the liquid crystal molecules 1011 of both left-eye array 122L and right-eye array 122R aligned in a common direction as in the example of FIG. 11. For example, the common direction of liquid crystal molecules 1011 may be selected based on the orientation of one or both of polarizers 804 and 810 (see FIGS. 8 and 9).

Figure 12:
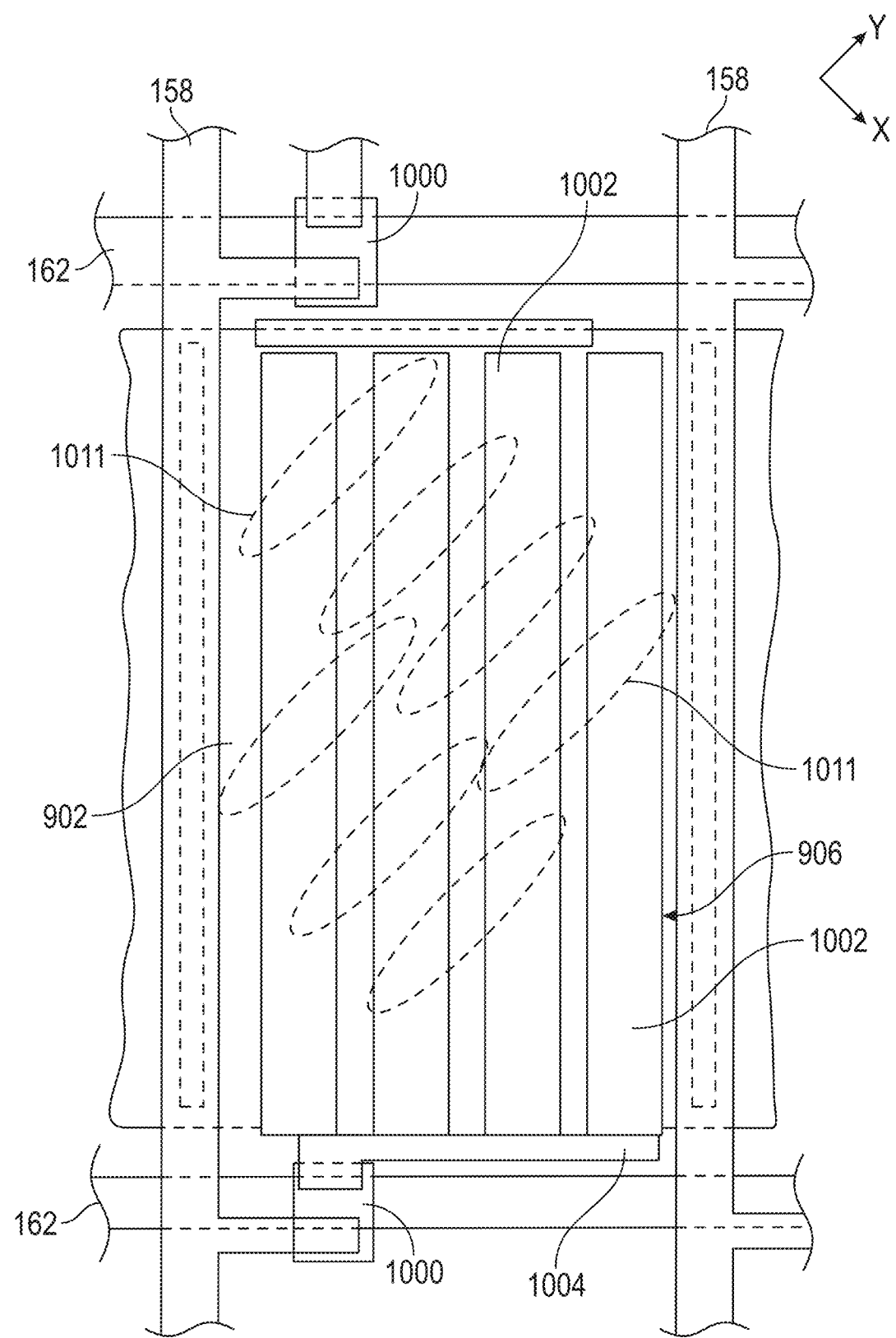
FIG. 12 illustrates a misalignment of liquid crystal molecules and pixel electrodes for a single display pixel, in accordance with aspects of the disclosure.

In this arrangement, and as shown in further detail in FIG. 12, the liquid crystal molecules 1011 that are aligned in the common vertical direction are also formed at an oblique angle (e.g., approximately 45 degrees) relative to the orientation of the pixel electrodes 906 (and electrode strips 1002), which are aligned parallel to the data lines 158 (and/or parallel the elongate dimension of the pixel area PA). In the example of FIGS. 11 and 12, a display panel 118 including a left-eye pixel array 122L having a first array center 404L (see FIG. 4) and a right-eye pixel array 122R having a second array center 404R is provided, in which the left-eye pixel array 122L includes a first plurality of parallel data lines 158L (see FIG. 6) that extend at a first oblique angle relative to a straight line 402 connecting the first array center 404L and the second array center 404R, and in which the right-eye pixel array 122R includes a second plurality of parallel data lines 158R that extend perpendicularly to the first plurality of parallel data lines 158L and at a second oblique angle with respect to the straight line 402 connecting the first array center 404L and the second array center 404R. In this example, the display panel 118 also includes a liquid crystal layer 808 (see FIGS. 8 and 9) having a plurality of liquid crystal molecules 1011 each having a default orientation that is aligned substantially perpendicularly to the straight line 402 connecting the first array center 404L and the second array center 404R. In this example, the left-eye pixel array 122L includes a first array of display pixels 150 each having at least one transparent electrode having an elongate dimension arranged in alignment with the first plurality of data lines 158L, and the right-eye pixel array 122R includes a second array of display pixels 150 each having at least one transparent electrode 906 having an elongate dimension arranged in alignment with the second plurality of data lines 158R.

However, it can be disadvantageous (e.g., due to increased LC response time and/or due to potential inter-pixel cross-talk) to have a misalignment of the pixel electrodes 906 and the default orientation of the liquid crystals 1011 as large as 45 degrees. For example, it can be preferable for the liquid crystal molecules (in the default orientation) to be aligned with the pixel electrodes to within less than, for example, ten degrees, seven degrees, or five degrees. In can also be disadvantageous (e.g., due to potential inter-array field interference) to have pixel electrodes in the left-eye and right-eye arrays oriented at different angles (e.g., with a difference of ninety degrees in the example of FIGS. 11 and 12).

Figure 13:
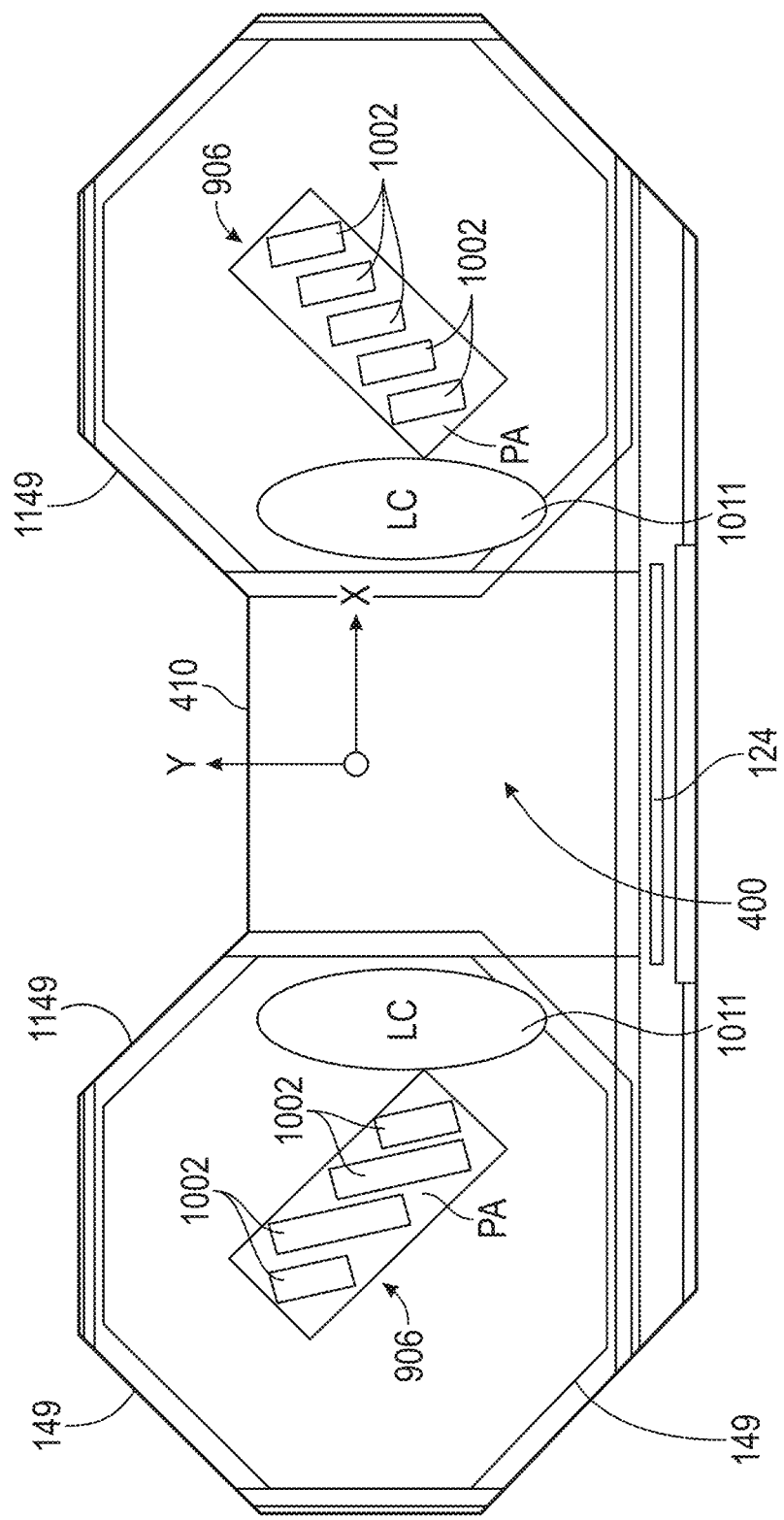
FIG. 13 illustrates another orientation of liquid crystal molecules and pixel electrodes, in accordance with aspects of the disclosure.
Figure 14:
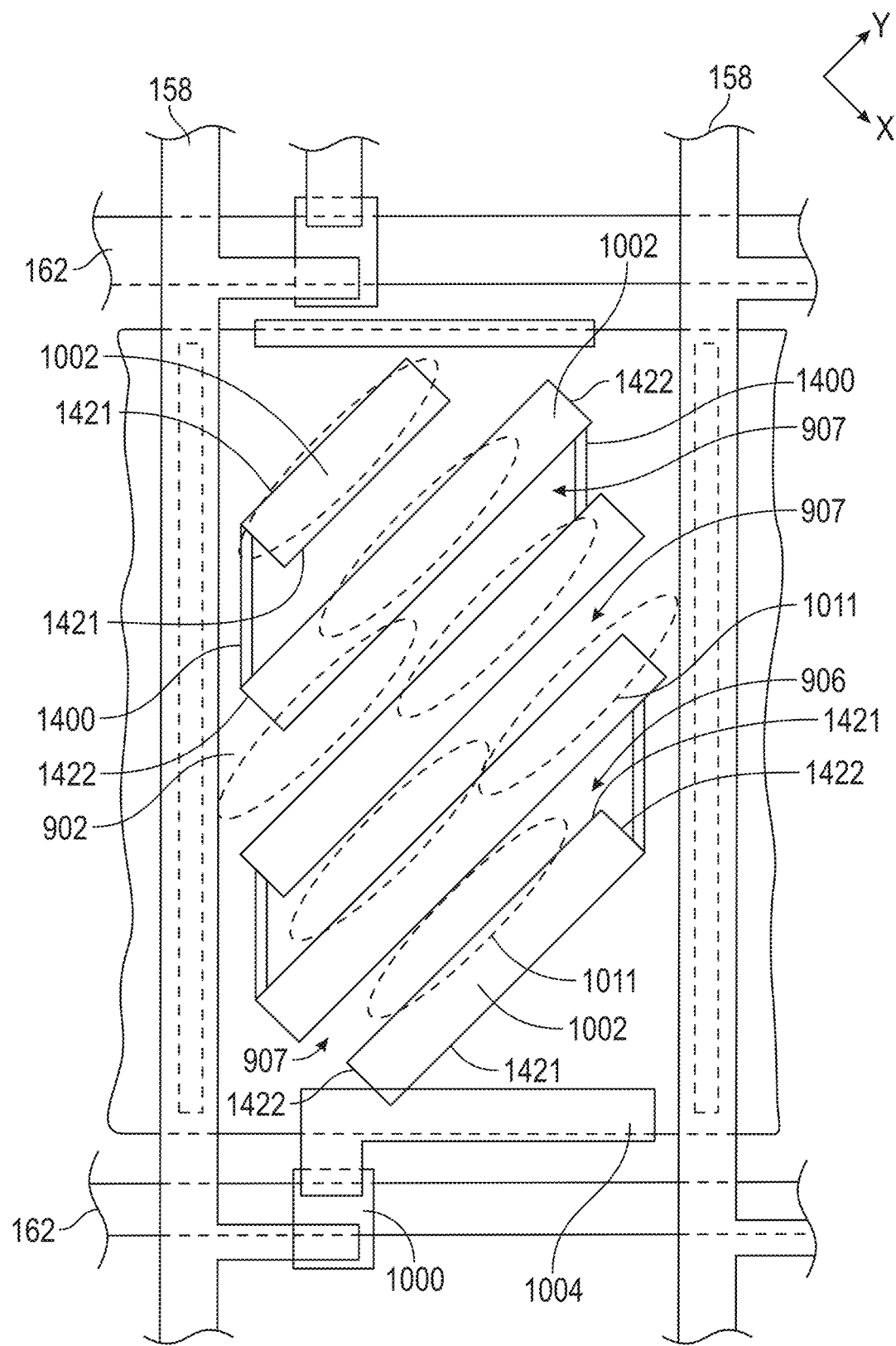
FIG. 14 illustrates an alignment of liquid crystal molecules and pixel electrodes for a single display pixel, in accordance with aspects of the disclosure.

In order to provide the spatial and energy efficiency advantages described herein of rotated left-eye and right-eye pixel arrays arranged at oblique angles relative to the X- and Y-axes of the display panel 118, while mitigating these potential disadvantages of the arrangement of FIGS. 11 and 12, a display panel 118 is disclosed in FIGS. 13 and 14 in which the liquid crystal molecules 1011 of left-eye array 122L and right-eye array 122R are arranged with a common vertical default orientation (as in the example of FIGS. 11 and 12), and the pixel electrodes 906 (including electrode strips 1002) are also aligned (e.g., to within 10 degrees) with the liquid crystal molecules.

For example, FIG. 13 illustrates a top view of a display panel 118, with pixel electrodes 906 (including electrode strips 1002) aligned within 10 degrees of the Y-axis of the display panel. In FIG. 13, an exaggerated view of a single subpixel 152 of each of left-eye array 122L and right-eye array 122R is shown, with the pixel area PA oriented in the same direction as that shown in FIGS. 11 and 12, but indicating an oblique angle between the pixel area PA and the elongate dimension of pixel electrode 906 (including electrode strips 1002). In this example, pixel electrodes 906 (including electrode strips 1002) are aligned (e.g., within 10 degrees) with the Y-axis of the display panel, and with the default orientation of the liquid crystal molecules 1011.

FIG. 14 illustrates a top view of a pixel circuit 1001 of a single subpixel 152, with the pixel electrode 906 aligned with the default orientation of the liquid crystal molecules 1011, as in the arrangement of FIG. 13. In the example of FIG. 14, pixel electrode 906 includes multiple electrode strips 1002 separated by gaps 907, where each electrode strip and each gap has an elongate dimension that extends (e.g., along the Y-axis) in a direction that forms an oblique angle with both the parallel data lines 158 and the parallel scan lines 162 of the array in which that pixel circuit is formed.

In the example of FIG. 14, a bottommost electrode strip 1002 of pixel electrode 906 is formed in contact with drain terminal 1004 of TFT 1000 for receiving a data signal from a corresponding data line 158 when TFT 1000 is activated by a corresponding scan line 162. In this example, the other electrode strips 1002 are electrically coupled to the bottommost electrode strip 1002 by connecting portions 1400. Connecting portions 1400 of pixel electrode 906 are illustrated in FIG. 14 as being oriented parallel to the data lines 158, but may instead be parallel to scan lines 162 or may extend between electrode strips 1002 at another (e.g., oblique angle) relative to the data lines 158 and/or scan line 162.

An outer periphery of each electrode strip 1002 of pixel electrode 906 may be defined by two opposing elongate outer edges 1421 joined by two opposing minor edges 1422. The elongate dimension of each electrode strip 1002 may extend the entire length of the two opposing outer edges 1421 between the two opposing minor edges 1422. Each of outer edges 1421 of each electrode strip 1002 is arranged, within the plane of control circuitry layer 810 (see, e.g., FIGS. 8 and 9) at an oblique angle with respect to the parallel data lines 158 and the parallel scan lines 162.

In the example of FIGS. 13 and 14, liquid crystal molecules 1011 (default orientation) and pixel electrodes 906 are aligned with each other, with the Y-axis of display panel 118, and obliquely relative to the data lines and scan lines of the display panel. However, it should be appreciated that the pixel electrodes 906 and the default orientation of the liquid crystal molecules 1011 may alternatively be aligned with each other, with the X-axis of display panel 118, and obliquely relative to the data lines and scan lines of the display panel, in some implementations. It should also be appreciated that, while the examples described herein describe the pixel electrode 906 being formed with electrode strips that are aligned with the default orientation of the liquid crystal molecules, the common electrode 902 can also, or alternatively, be formed with electrode strips that are aligned with the default orientation of the liquid crystal molecules.

In the example of FIGS. 13 and 14, a liquid crystal display panel 118 is shown, that includes a control circuitry layer 810 (see FIGS. 8 and 9), the control circuitry layer 810 including a plurality of parallel scan lines 162, a plurality of parallel data lines 158 arranged perpendicularly to the plurality of parallel scan lines 162, and an array of display pixel circuits 1001 arranged along the scan lines and the data lines. The display panel also includes a liquid crystal layer 808, including liquid crystal molecules 1011 having a default orientation at an oblique angle with respect to both the scan lines and the data lines. In this example, each of the display pixel circuits 1001 includes at least one transparent electrode 906 (e.g., one or more electrode strips 1002) having an elongate dimension that is aligned with the default orientation of the liquid crystal molecules 1011 at the oblique angle with respect to the scan lines 162 and the data lines 158.

In this example, the liquid crystal display panel 118 may also include an alignment layer (e.g., alignment layer 910 of FIG. 9) on the control circuitry layer 810 and adjacent to the liquid crystal layer 808, the alignment layer 910 configured to cause the liquid crystal molecules 1011 to align in the default orientation in the absence of an applied electric field (e.g., an applied electric field generated by the pixel electrode 906 and/or the common electrode 902). In this example, the plurality of parallel scan lines 162, the plurality of parallel data lines 158, and the array of display pixel circuits 1001 are, respectively, a first plurality of scan lines 162L, a first plurality of data lines 158L, and a first array 122L of display pixel circuits 1001 configured to display first content for a first eye of a user, and the control circuitry layer 810 further includes, for displaying second content for a second eye of the user, a second plurality of parallel scan lines 162R arranged perpendicularly to the first plurality of scan lines 162L, a second plurality of parallel data lines 158R arranged perpendicularly to the second plurality of scan lines 162R and the first plurality of data lines 158L, and a second array 122R of display pixel circuits 1001 arranged along the second scan lines 162R and the second data lines 158R. In this example, each display pixel circuit 1001 of the second array 122R may include at least one transparent electrode 906 (e.g., one or more electrode strips 1002) having an elongate dimension that is aligned with the default orientation of the liquid crystal molecules 1011 and at an oblique angle with respect to the second scan lines 162R and the second data lines 158R.

In this example, the elongate dimension of the at least one transparent electrode 906 of each of the display pixel circuits 1001 of the first array 122L is aligned parallel to the elongate dimension of the at least one transparent electrode 906 of each of the display pixel circuits 1001 of the second array 122R. In this example, the at least one transparent electrode 906 of each of the display pixel circuits 1001 includes a rectilinear outer periphery defined, in part, by two opposing outer elongate edges 1421 that are parallel to each other and aligned with the default orientation of the liquid crystal molecules 1011 at the oblique angle with respect to the scan lines 162 and the data lines 158.

In this example, each of the display pixel circuits 1001 further includes a thin-film transistor 1000 having a first terminal 1004 coupled to the at least one transparent electrode 906 and a second terminal 1005 coupled to a corresponding one of the data lines 158. In this example, the thin-film transistor 1000 of each of the display pixel circuits further comprises a gate terminal 1007 coupled to a corresponding one of the scan lines 162.

In this example, the at least one transparent electrode 906 of each of the display pixel circuits 1001 includes a plurality of transparent electrode strips 1002, each having an elongate dimension that is aligned with the default orientation of the liquid crystal molecules 1011 at the oblique angle with respect to the scan lines 162 and the data lines 158. In this example, each of the display pixel circuits 1001 further includes a common electrode 902 having an elongate dimension that extends in a direction parallel the data lines 158.

In this example, the common electrode 902 and the at least one transparent electrode 906 of each display pixel circuit 1001 are operable, by a scan signal on a corresponding scan line 162 and a data signal on a corresponding data line 158, to realign at least some of the liquid crystal molecules 1011 for each display pixel (e.g., display pixel 150 or subpixel 152), away from the default orientation, to control an amount of display light (e.g., display light 826) emitted that display pixel. In various examples, the oblique angle between the default orientation of the liquid crystal molecules and the scan lines and the data lines is an angle between thirty-five degrees and fifty-five degrees (e.g., forty-five degrees). In various examples, the elongate dimension of the at least one transparent electrode 906 of each of the display pixel circuits 1001 is aligned with the default orientation of the liquid crystal molecules 1011 to within less than ten degrees.

The display panel 118 in the arrangement of FIGS. 11 and 12, or in the arrangement of FIGS. 13 and 14, can be implemented in a head-mountable display device as described above in connection with FIGS. 1-7.

In an implementation in which the display panel 118 in the arrangement of FIGS. 13 and 14 is implemented in the head-mountable display device 102, a head-mountable display device is provided that includes a housing 110 configured to be mounted to a head of a user, a display panel 118, within the housing 110, including a left-eye pixel array 122L to display left-eye content and a right-eye pixel array 122R to display right-eye display content. In this implementation, the head-mountable display device 102 may include a left-eye lens 104L having a first lens center 200L and mounted to the housing 110 in optical alignment with the left-eye pixel array 122L, and a right-eye lens 104R having a second lens center 200R and mounted to the housing 110 in optical alignment with the right-eye pixel array 122R. In this implementation, the left-eye pixel array 122L may include a first plurality of parallel data lines 158L that extend at a first oblique angle relative to a straight line 202 connecting the first lens center 200L and the second lens center 200R, and the right-eye pixel array 122R may include a second plurality of parallel data lines 158R that extend perpendicularly to the first plurality of parallel data lines 158L and at a second oblique angle with respect to the straight line 202 connecting the first lens center 200L and the second lens center 200R. In this implementation, the left-eye pixel array 122L may include a first array of display pixel circuits 1001 each including at least one transparent electrode 906 having an elongate dimension arranged at a third oblique angle relative to the first plurality of parallel data lines 158L, and the right-eye pixel array 122R may include a second array of display pixel circuits 1001 each including at least one transparent electrode 906 having an elongate dimension arranged at a fourth oblique angle relative to the second plurality of parallel data lines 158R.

In this implementation, the elongate dimension of the at least one transparent electrode 906 of each of the display pixel circuits 1001 of the first array is arranged parallel to the elongate dimension of the at least one transparent electrode 906 of each of the display pixel circuits 1001 of the second array. In this implementation, the elongate dimension of the at least one transparent electrode 906 of each of the display pixel circuits 1001 of the first array is arranged perpendicularly to the straight line 202 connecting the first lens center 200L and the second lens center 200R. In this implementation, the display panel further may also include a liquid crystal layer 808 having a plurality of liquid crystal molecules 1011 each having an elongate dimension that is aligned with the elongate dimensions of the at least one transparent electrodes 906 of the display pixel circuits 1001 of the left-eye pixel array 122L and the right-eye pixel array 122R. In various implementations, display panel 118 may include a monolithic substrate on which the left-eye pixel array 122L and the right-eye pixel array 122R are formed, or may include a first substrate on which the left-eye pixel array is formed and a second substrate on which the right-eye pixel array is formed.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A liquid crystal display panel comprising:
   a control circuitry layer comprising:
      a first plurality of parallel scan lines,
      a first plurality of parallel data lines arranged perpendicularly to the first plurality of parallel scan lines,
      a first array of display pixel circuits configured to display first content for a first eye of a user, the first array of display pixel circuits arranged along the first plurality of parallel scan lines and the first plurality of parallel data lines,
      a second plurality of parallel scan lines arranged perpendicularly to the first plurality of scan lines,
      a second plurality of parallel data lines arranged perpendicularly to the second plurality of scan lines and the first plurality of data lines, and
      a second array of display pixel circuits configured to display second content for a second eye of the user, the second array of display pixel circuits arranged along the second plurality of parallel scan lines and the second plurality of parallel data lines; and
   a liquid crystal layer comprising liquid crystal molecules having a default orientation at an oblique angle with respect to both the first plurality of parallel scan lines and the first plurality of parallel data lines,
   wherein each display pixel circuit of the first array includes at least one transparent electrode having an elongate dimension that is aligned with the default orientation of the liquid crystal molecules at the oblique angle with respect to the first plurality of parallel scan lines and the first plurality of parallel data lines, and
   wherein each display pixel circuit of the second array includes at least one transparent electrode having an elongate dimension that is aligned with the default orientation of the liquid crystal molecules and at an oblique angle with respect to the second plurality of parallel scan lines and the second plurality of parallel data lines.

2. The liquid crystal display panel of claim 1, further comprising an alignment layer on the control circuitry layer and adjacent to the liquid crystal layer, the alignment layer configured to cause the liquid crystal molecules to align in the default orientation in the absence of an applied electric field.

3. The liquid crystal display panel of claim 1, wherein the elongate dimension of the at least one transparent electrode of each of the display pixel circuits of the first array is aligned parallel to the elongate dimension of the at least one transparent electrode of each of the display pixel circuits of the second array.

4. The liquid crystal display panel of claim 1, wherein the at least one transparent electrode of each of the display pixel circuits of the first array comprises a rectilinear outer periphery defined, in part, by two opposing outer elongate edges that are parallel to each other and aligned with the default orientation of the liquid crystal molecules at the oblique angle with respect to the first plurality of parallel scan lines and the first plurality of parallel data lines.

5. The liquid crystal display panel of claim 1, wherein each of the display pixel circuits of the first array further comprises a thin-film transistor having a first terminal coupled to the at least one transparent electrode and a second terminal coupled to a corresponding one of the first plurality of parallel data lines.

6. The liquid crystal display panel of claim 5, wherein the thin-film transistor of each of the display pixel circuits of the first array further comprises a gate terminal coupled to a corresponding one of the first plurality of parallel scan lines.

7. The liquid crystal display panel of claim 1, wherein the at least one transparent electrode of each of the display pixel circuits of the first array comprises a plurality of transparent electrode strips, each formed from indium tin oxide and each having an elongate dimension that is aligned with the default orientation of the liquid crystal molecules at the oblique angle with respect to the first plurality of parallel scan lines and the first plurality of parallel data lines.

8. The liquid crystal display panel of claim 1, wherein each of the display pixel circuits of the first array further comprises a common electrode having an elongate dimension that extends in a direction parallel the first plurality of parallel data lines.

9. The liquid crystal display panel of claim 8, wherein the common electrode and the at least one transparent electrode of each display pixel circuit of the first array are operable, by a scan signal on a corresponding scan line and a data signal on a corresponding data line, to realign at least some of the liquid crystal molecules for each display pixel, away from the default orientation, to control an amount of display light emitted by that display pixel.

10. The liquid crystal display panel of claim 1, wherein the liquid crystal display panel comprises first and second polarizers on opposing sides of the liquid crystal layer, wherein the default orientation of the liquid crystal molecules is orthogonal to a polarization direction of at least one of the first and second polarizers, and wherein the oblique angle is an angle between thirty-five degrees and fifty-five degrees.

11. The liquid crystal display panel of claim 10, wherein the elongate dimension of the at least one transparent electrode of each of the display pixel circuits of the first array is aligned with the default orientation of the liquid crystal molecules to within less than ten degrees.

12. A head-mountable display device, comprising:
a housing configured to be mounted to a head of a user;
a display panel, within the housing, comprising a left-eye pixel array to display left-eye content and a right-eye pixel array to display right-eye display content;
a left-eye lens having a first lens center and mounted to the housing in optical alignment with the left-eye pixel array; and
a right-eye lens having a second lens center and mounted to the housing in optical alignment with the right-eye pixel array,
wherein the left-eye pixel array comprises a first plurality of parallel data lines that extend at a first oblique angle relative to a straight line connecting the first lens center and the second lens center,
wherein the right-eye pixel array comprises a second plurality of parallel data lines that extend perpendicularly to the first plurality of parallel data lines and at a second oblique angle with respect to the straight line connecting the first lens center and the second lens center, and
wherein the left-eye pixel array comprises a first array of display pixel circuits each including at least one transparent electrode having an elongate dimension arranged at a third oblique angle relative to the first plurality of parallel data lines, and
wherein the right-eye pixel array comprises a second array of display pixel circuits each including at least one transparent electrode having an elongate dimension arranged at a fourth oblique angle relative to the second plurality of parallel data lines.

13. The head-mountable display device of claim 12, wherein the elongate dimension of the at least one transparent electrode of each of the display pixel circuits of the first array is arranged parallel to the elongate dimension of the at least one transparent electrode of each of the display pixel circuits of the second array.

14. The head-mountable display device of claim 13, wherein the elongate dimension of the at least one transparent electrode of each of the display pixel circuits of the first array is arranged perpendicularly to the straight line connecting the first lens center and the second lens center.

15. The head-mountable display device of claim 12, wherein the display panel further comprises a liquid crystal layer having a plurality of liquid crystal molecules having an elongate dimension that is aligned with the elongate dimensions of the at least one transparent electrodes of the display pixel circuits of the left-eye pixel array and the right-eye pixel array.

16. The head-mountable display device of claim 12, wherein the display panel comprises a monolithic substrate on which the left-eye pixel array and the right-eye pixel array are formed.

17. The head-mountable display device of claim 12, wherein the display panel comprises a first substrate on which the left-eye pixel array is formed and a second substrate on which the right-eye pixel array is formed.

18. A liquid crystal display panel, comprising:
a display panel comprising a left-eye pixel array having a first array center and a right-eye pixel array having a second array center,
wherein the left-eye pixel array comprises a first plurality of parallel data lines that extend at a first oblique angle relative to a straight line connecting the first array center and the second array center, and
wherein the right-eye pixel array comprises a second plurality of parallel data lines that extend perpendicularly to the first plurality of parallel data lines and at a second oblique angle with respect to the straight line connecting the first array center and the second array center; and
a liquid crystal layer having a plurality of liquid crystal molecules having a default orientation that substantially perpendicular to a straight line connecting the first array center and the second array center.

19. The liquid crystal display panel of claim 18, wherein the left-eye pixel array includes a first array of display pixels each having at least one transparent electrode with an elongate dimension arranged in alignment with the first plurality of parallel data lines, and the right-eye pixel array includes a second array of display pixels each having at least one transparent electrode with an elongate dimension arranged in alignment with the second plurality of parallel data lines.

* * * * *